June 4, 1968     J. T. SHORT     3,386,403
MULTI-PURPOSE TUFTING MACHINE AND METHOD
Filed Dec. 9, 1964     11 Sheets-Sheet 1

INVENTOR.
Joe T. Short
BY
Newton, Hopkins & Jones
ATTORNEYS

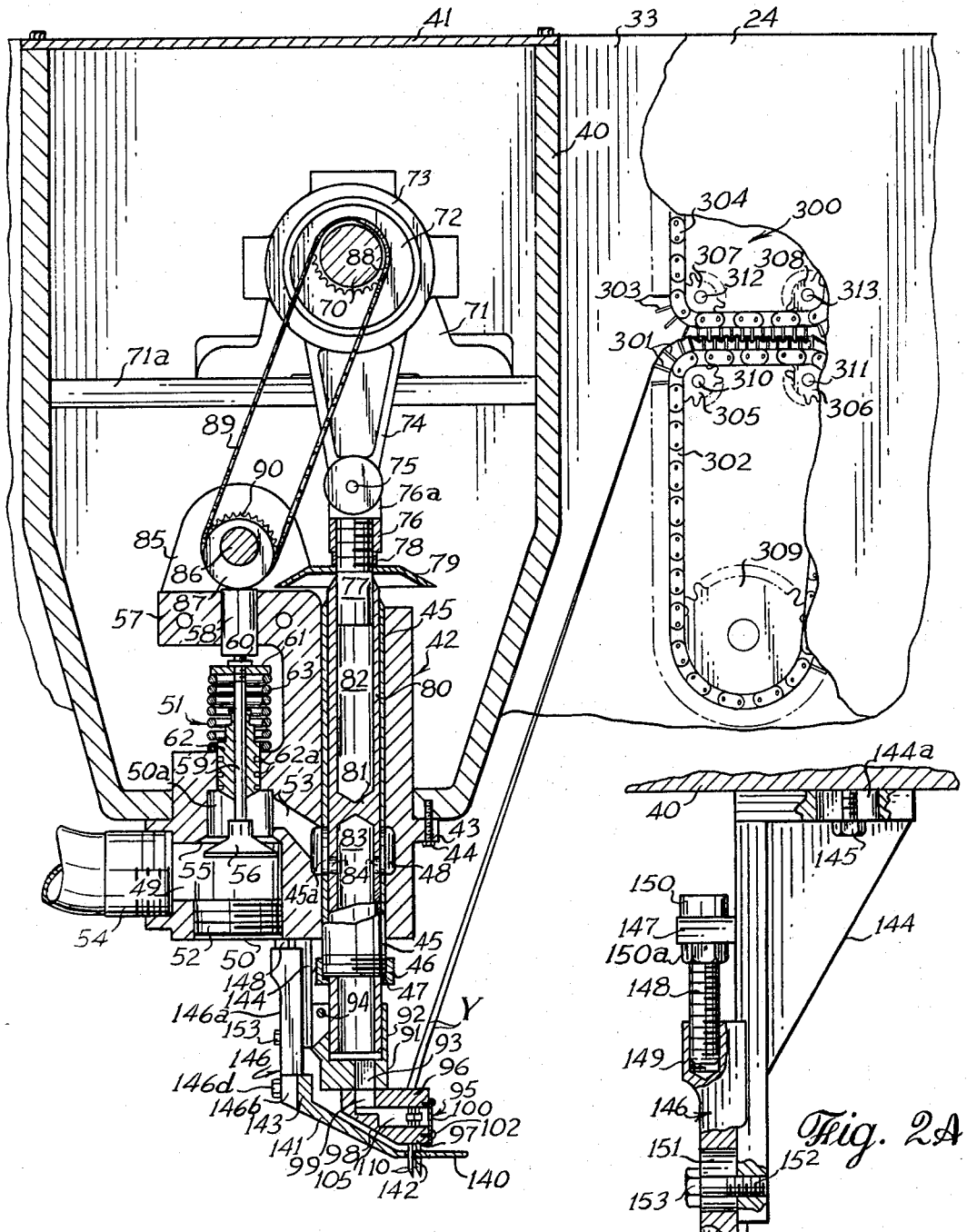
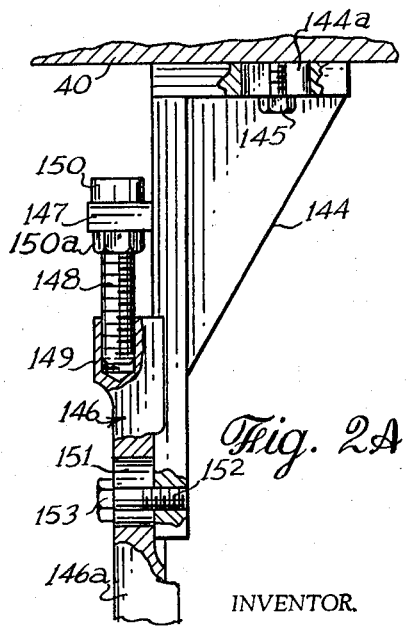
Fig. 2
Fig. 2A
INVENTOR.
Joe T. Short

INVENTOR.
Joe T. Short
BY
Newton, Hopkins & Jones
ATTORNEYS

June 4, 1968  J. T. SHORT  3,386,403
MULTI-PURPOSE TUFTING MACHINE AND METHOD
Filed Dec. 9, 1964  11 Sheets-Sheet 7
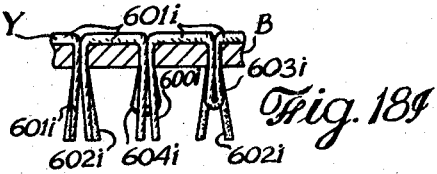
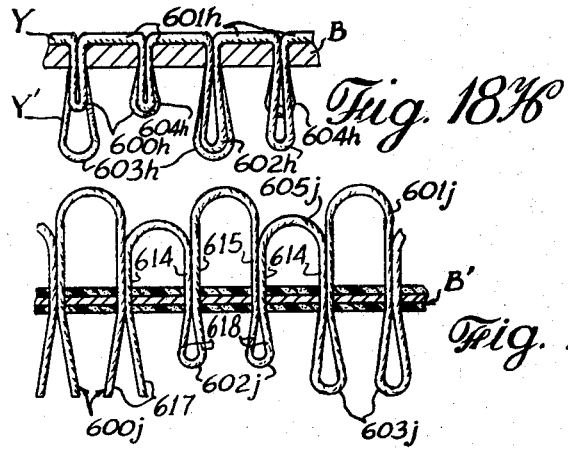
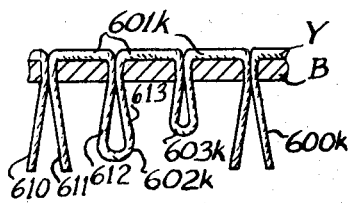
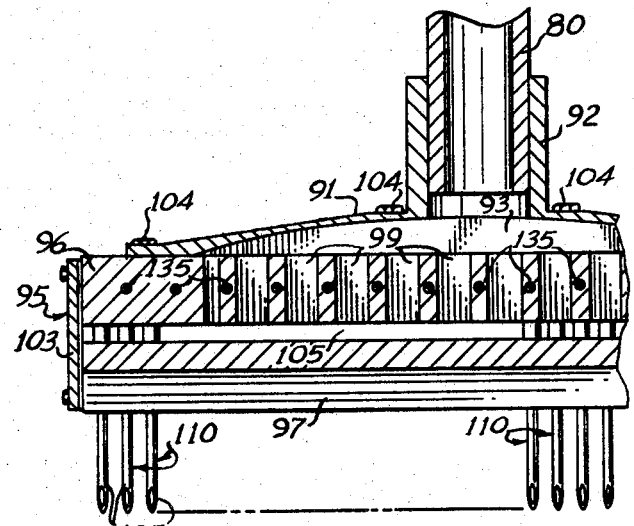
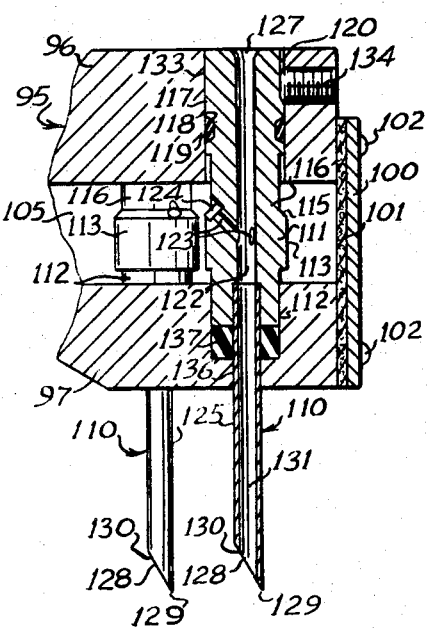
INVENTOR.
Joe T. Short
BY
Newton, Hopkins & Jones
ATTORNEYS

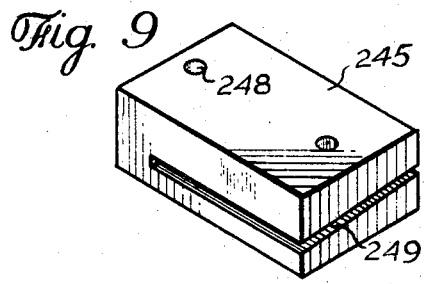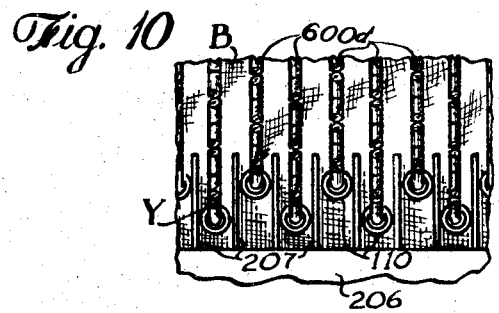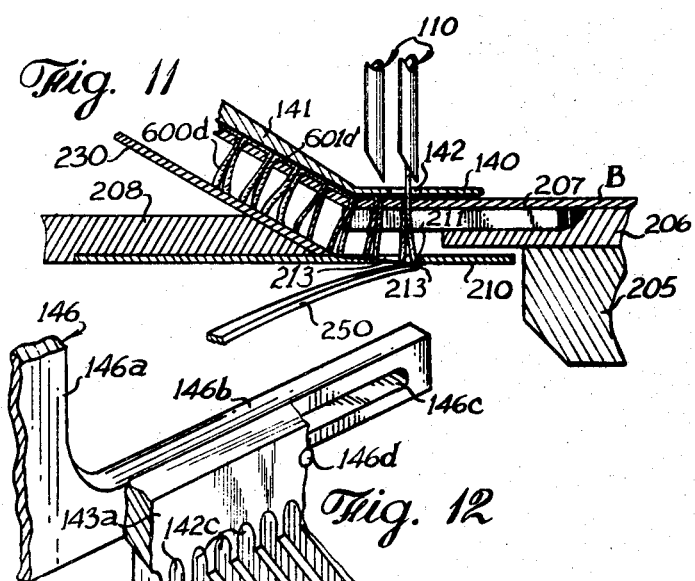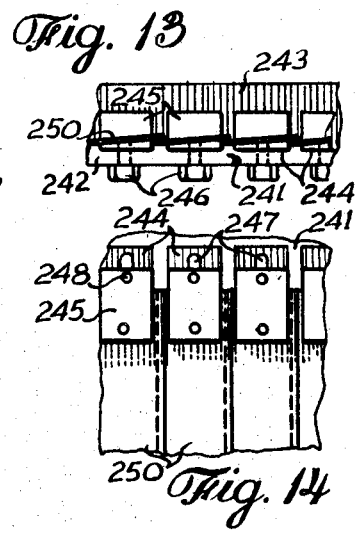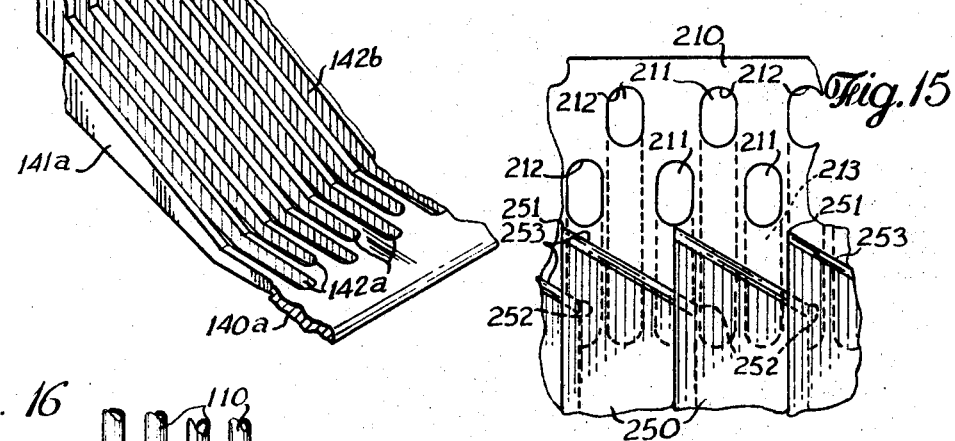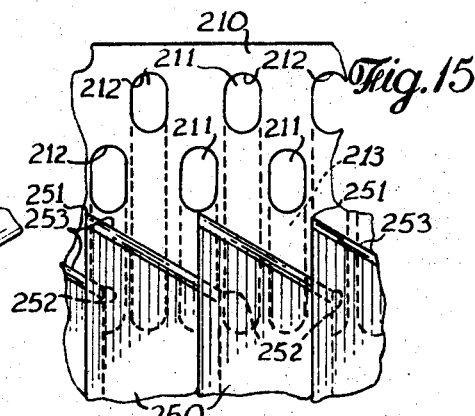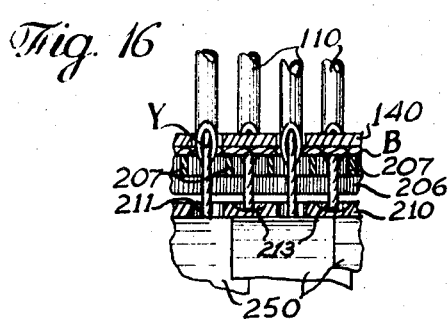

INVENTOR.
Joe T. Short
BY
Newton, Hopkins & Jones
ATTORNEYS

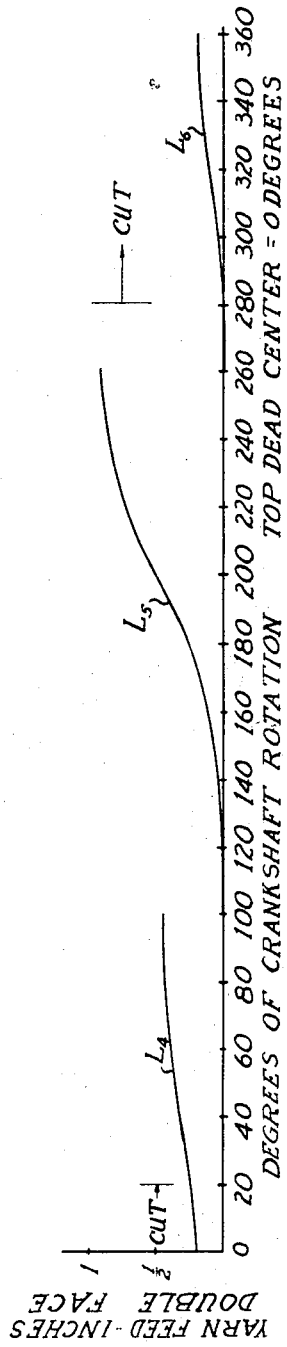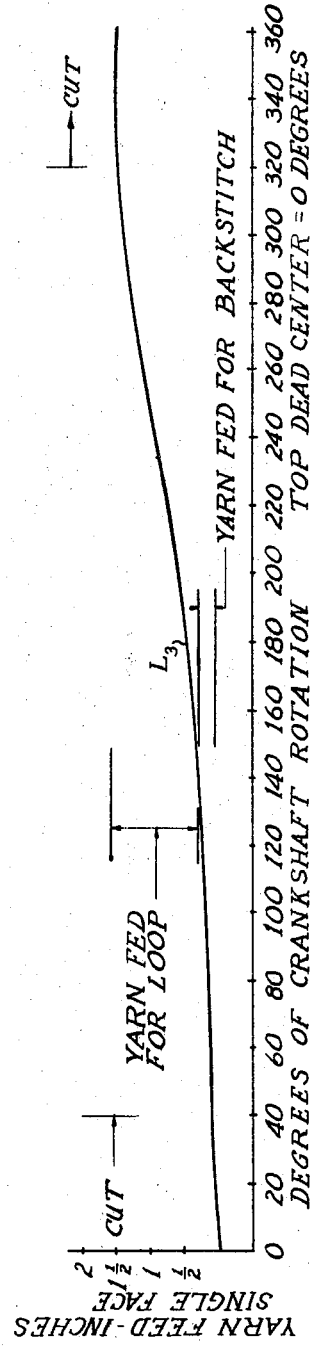

June 4, 1968  J. T. SHORT  3,386,403
MULTI-PURPOSE TUFTING MACHINE AND METHOD
Filed Dec. 9, 1964  11 Sheets-Sheet 11

INVENTOR.
Joe T. Short
BY
Newton, Hopkins & Jones
ATTORNEYS

United States Patent Office 3,386,403
Patented June 4, 1968

3,386,403
MULTI-PURPOSE TUFTING MACHINE
AND METHOD
Joe T. Short, West Point, Ga., assignor, by mesne assignments, to Callaway Mills Company, La Grange, Ga., a corporation of Georgia
Filed Dec. 9, 1964, Ser. No. 417,165
27 Claims. (Cl. 112—266)

ABSTRACT OF THE DISCLOSURE

There is disclosed a tufting machine and method for forming successive loops of yarn, some of the loops being long and others being short, the loops being held in extended condition by differential fluid pressure and adjustable severing means being provided to selectively sever all of the loops, the long loops only or none of the loops as desired.

---

This application is a continuation-in-part of my copending application Ser. No. 243,309 filed Dec. 10, 1962, entitled Tufting, now abandoned.

The invention relates to tufting machines and is more particularly concerned with a multi-purpose tufting machine and process of producing pile fabric.

In the past, various types of multi-needle tufting machines have been devised and have been used widely. The commercially available machines fall into three general categories; namely, loop pile tufting machines, cut pile tufting machines and combination cut pile and loop pile tufting machines.

The loop pile tufting machines are utilized for sewing a level loop pile fabric and, if provided with any one of a large variety of yarn control mechanisms, can be used for sewing high and low loop pile fabric in which a prescribed pattern is defined by the loops of different heights. Indeed, such loop pile tufting machines, when provided with certain types of yarn control mechanisms, are capable of sewing pile fabric in which the loops have three different pile heights.

The second type of tufting machine, heretofore used, is the cut pile tufting machine which has some of the same mechanisms as the loop pile tufting machine; however, it is provided with cut pile loopers which respectively hold the loops when produced by the needles. The cut pile machines have knives respectively disposed adjacent the loopers for progressively severing the leading loop after approximately two or three subsequent loops have been formed. The reason advanced for the necessity of severing the loops only after subsequent loops have been received on a looper is that, if the loops were severed earlier, for example as the needle was withdrawn from the backing material, the needle might also pull out one leg of the loop due to tension on the yarn or, if the loops were cut as the second loop was formed, the down stroke of the needle might cause a back drawing of portions of the yarn from the severed loop.

The knives of the conventional cut pile tufting machine are so disposed and tensioned with respect to their associated loopers that running of the machine tends to dull the knives.

When the knives of the prior art cut pile machines become dull, there is some tendency of the knives not to cut loops which, if not severed completely, would remain on loopers and cause portions of the yarns to be pulled out of position in the fabric. The cut may also be ragged. Therefore, periodically, all knives must be removed from the machine, individually hand sharpened and returned to the machine. When returned, the looper block carrying each knife must be readjusted for the proper tensioning of the knife. Thus, considerable "down time" is involved with a conventional cut pile tufting machine in simply removing, sharpening, and reinstalling the knives.

Since the knife of a conventional cut pile tufting machine rides along one side of a looper as the looper rocks back and forth, the knife does not cut the loops to provide equal length legs. Instead, what is known in the trade as a "J-cut" is produced wherein each cut pile tuft has one leg which is slightly longer than the other leg. Therefore, in the event a uniform pile height is desired, the fabric must be subjected, after the tufting operation, to a shearing operation in which the tip portions of some or all of the tufts are severed along a common plane. This imparts to the tufts a uniform appearing surface.

The combination loop and cut machines produce a product in which a prescribed pattern is defined by areas of cut tufts and areas of loop tufts. Generally speaking, the loops are substantially lower than the tufts. These combination machines are quite complicated since, in addition to the loopers for temporarily holding the loops which remain loops, there is additional equipment, such as additional loopers and their associated knives for catching, holding and cutting the loops.

In addition to the commercially available machines described above, various attempts have been made to produce tufting machines and/or procedures for producing a multi-color effect in the resulting fabric. Perhaps the most commonly used procedure for producing a multi-color effect involves the twisting of different colored yarns together or the space dying of the yarns. A random pattern usually results from the production of tufted fabric using multi-color yarn or space dyed yarn.

Quite complicated machines have been devised for sewing tufts of different colored yarns in the respective longitudinal rows. These machines, for various reasons, have not received wide acceptance.

Also, it has been suggested that double eyed needles be used for sewing pile from two yarns simultaneously while selectively regulating the pile height thereof. This, too, has not proved practical.

Still other types of machines have been devised for sewing a double faced tufted fabric and others for producing a skip stitch fabric.

Generally speaking, the prior art tufting machines discussed above have been for a single purpose. For example, they have been capable of producing either loop pile fabric or cut pile fabric but not both or they have been adapted to produce pattern goods of cut and loop tufts and would not ordinarily be used for level loop pile fabric or straight cut pile fabric because of lack of efficiency.

Therefore, it has been general practice for a mill to own and operate two or more different types of machines for the production of two or more different types of fabrics. There has, however, been a long felt want for a practical machine which will function well for selectively producing many different types of tufted fabrics. At this time, I know of no machine which will satisfy this long felt want and, indeed, machines which will truly function well without major modifications for producing even two different types of pile fabrics, with the possible exception of a "Schroll" or other type of high-low loop pile machine which can be utilized for sewing level loop pile.

All of the prior art machines described above operate at relatively low speed and, because of their complexity and design, each requires a considerable amount of "down time" for the rethreading of the yarns, replacing of th needles or loopers and/or the sharpening of the knives. Such prior art machines require periodic mending of the fabric with a mending gun. Hence, such prior art machines, while surpassing a loom in the production of fabric, are relatively inefficient, slow, and require constant attention.

Contrary to prior art beliefs and practices, I have devised a tufting machine which is truly a multi-purpose machine which can selectively produce any one of the below listed types of fabric without appreciable modification of the machine:

(1) Level loop pile fabric (uniform pile height);
(2) Level cut pile fabric (uniform pile height);
(3) Pattern goods having combination loop pile and cut pile of uniform pile height;
(4) Pattern goods having combination loop pile and cut pile in which the cut pile is longer than the loop pile;
(5) Pattern loop pile fabric having a pattern defined by two or more pile heights;
(6) Pattern goods having a primary design from cut pile and a secondary design from high and low loop piles;
(7) Double face tufted fabric in which:
  (a) one side is level loop pile and the other side is level loop pile; or
  (b) one side is high-low loop pile and the other side is level loop pile; or
  (c) one side is level loop pile and the other side is level cut pile; or
  (d) one side is high-low loop pile and the other side is level cut pile; or
  (e) one side is high-low loop pile and the other side is cut and loop pile of uniform pile height; or
  (f) one side is high-low loop pile and the other side is high cut low loop pile;
(8) Patterned multi-color fabric of substantially any of the above listed types;
(9) Level cut pile fabric having extremely low tufts;
(10) Skip stitch tufted fabric in which the spacing of the tufts or the legs of the loop vary.

The stitch rate and pile height produced by my machine may be readily and easily altered, as can the speed of the machine. Furthermore, no shearing of the fabric in a separate operation is required since no "J-cut" is produced.

Briefly described, the machine of the present invention includes a frame having spaced, opposed, upright, tubular end members which carry therebetween an upper cross head and a lower cross bed. The cross head carries a presser foot assembly, an air control assembly, and a needle reciprocator assembly by means of which the hollow needles of the machine are reciprocated as controlled amounts of air are fed continuously or intermittently to the needles for discharging yarns therefrom. A yarn control mechanism carried by the end members feeds varying amounts of yarns to the needles according to a prescribed pattern or uniform amounts of yarns to the needles.

Feed rollers, carried by the end members in front of and behind the cross bed and cross head, feed the backing material through the machine, beneath the needles and above the cross bed for receiving the yarns sewn by the needles.

The cross bed forms a plenum chamber which is normally maintained under a sub-atmospheric condition. The upper end of the plenum chamber is substantially closed by a shearing mechanism which may be moved toward and away from the backing material for determining the height at which the loops of the yarns in the backing material are to be sheared and for retraction sufficiently to avoid all cutting action, if desired. The shearing mechanism includes a support frame which carries a shear plate disposed adjacent the path of travel of the backing material, the shear plate being provided with holes corresponding to the number and spacing of the needles for receiving therein the ends or bights of the respective loops of yarns as they are sewn by the needles into the backing material.

The support frame also carries a rocker mechanism which moves knives back and forth across the lower surface of the shear plate for severing the ends or bights of the loops received in the holes. Those loops, which do not protrude below the bottom surface of the shear plate, are not cut and remain as loops in the backing material.

The support frame carries, rearwardly of the shear plate, a deflector plate which cooperates with the presser foot assembly for defining an upwardly inclined pathway, the purpose of which is to guide the tufted backing material along an inclined path and thereby tend to urge the loops out of the holes of the shear plate as quickly as possible commensurate with the loop forming operation and shearing action, by causing a flexing of the backing material immediately rearwardly of the needles.

The valving arrangement of the air control assembly coupled with the feed of the yarns to the needles prescribes the height of each loop which is formed on the lower side of the backing material, as well as whether or not a conventional backstitch or a loop of predetermined height is to be formed on the upper surface of the backing material.

The machine of the present invention may be readily and easily utilized for producing pile fabric having multi-color effects. This may be accomplished in several ways. For example, the machine may be threaded so as to provide two or more yarns in a single needle of the machine, the feed of the yarns being controlled by the yarn feed mechanism so as to create high-low loops according to a pattern. Since the color of the high loops predominates, a multi-color design is created in the resulting fabric defined by these high loops. In the machine of the present invention, the high loops if desired may be severed.

Another way of producing a multi-color effect, utilizing the apparatus of the present invention, is to feed different colored yarns to selected adjacent needles and control the pile height of the yarns so as to permit one color to predominate as the long loops in an area defining a pattern. Here again, the yarn feed mechanism is employed to dictate which of the loops are to be the long loops and which are to be the short loops. Furthermore, regardless of whether a needle receives one or a plurality of yarns, the high or long loops may be sheared, if desired, by the shearing mechanism of the machine of the present invention.

The apparatus of the present invention, when functioning to produce cut pile fabric, performs quite a unique process in that after penetration of the needles, as each loop is urged by the differential fluid pressure out of the needle beyond the extent of penetration of the needle and as the loop is held in an extending condition by the differential fluid pressure, the shearing mechanism, in this single cycle of the machine, shears or cuts the loop. The cut is parallel to the backing material so that a smooth uniform height cut pile area is produced.

It is therefore an object of the present invention to provide a multi-purpose tufting machine which is inexpensive to manufacture, durable in structure and efficient in operation.

Another object of the present invention is to provide a tufting machine which will selectively produce substantially all types of tufted products presently in commercial production.

Another object of the present invention is to provide a tufting machine which can be readily and easily converted from one type of tufting operation to another type of tufting operation and in which the stitch rate and pile height can be selectively varied, as desired.

Another object of the present invention is to provide a tufting machine which, while being extremely versatile as to the type of product produced by the machine, is, at the same time, capable of being operated at a speed far in excess of the speed of conventional cut pile tufting machines.

Another object of the present invention is to provide a tufting machine which has relatively few moving parts and which has still fewer moving parts which require adjustment.

Another object of the present invention is to provide a tufting machine which, while being versatile as to the types of product which can be produced on the machine, nevertheless will produce superior tufted products.

Another object of the present invention is to provide a cut pile tufting machine which in a single operation will produce and cut the tufts evenly so as to provide a finished product which is superior in appearance and will eliminate the necessity of shearing the product in a subsequent operation.

Another object of the present invention is to provide a cut pile tufting machine which has a shearing mechanism which will readily cut a variety of different types of yarns and in which the cutting mechanism is self sharpening.

Another object of the present invention is to provide, in a tufting machine which employs fluid for the discharge of the yarns from the needles, a valving system which accurately will intermittently supply fluid for the needles while minimizing the fluid requirements and thereby reduce the power requirements of the compressor or other differential pressure mechanisms utilized in conjunction with the machine.

Another object of the present invention is to provide, in a tufting machine which utilizes fluid for the discharge of the yarns from the needles, a valving arrangement for the fluid in which the lubricant of the machine is largely prevented from being entrained in the fluid.

Another object of the present invention is to provide a tufting machine which may be readily and easily threaded and rethreaded.

Another object of the present invention is to provide a tufting machine in which there is a minimum of stress on the yarns.

Another object of the present invention is to provide a cut pile tufting machine in which there is little danger of the increments of yarns, which extend between and form the backstitch of adjacent longitudinal loops, being dislodged from the backing material if the knives become dull and in which there is no necessity for collecting the loops on loopers for cutting after subsequent loops have been sewn.

Another object of the present invention is to provide, in a tufting machine, a quite simple and effective mechanism for advancing the backing material through the tufting zone at varying rates.

Another object of the present invention is to provide a cut pile tufting machine which will automatically collect the lint created by the severing of the tufts and at the same time will maintain both the backing material and the yarns being sewn thereinto in a clean and lint free condition.

Another object of the present invention is to provide a tufting machine in which the speed of tufting may be readily and easily altered.

Another object of the present invention is to provide a tufting machine which will operate for extended periods of time without breakdown and without appreciable "down time."

Another object of the present invention is to provide an effective and inexpensive process for producing pile fabric having cut pile therein.

Other objects, features and advantages of the present invention will become apparent from the following description when taken in conjunction with the accompanying drawings wherein like characters of reference designate corresponding parts and in which:

FIG. 2 is an enlarged, fragmentary vertical sectional view of the upper portion of the machine shown in FIG. 1, and illustrating the cross head carrying the air control assembly, needle reciprocator assembly and the presser foot assembly, the view also disclosing a portion of the yarn control mechanism feeding yarns to the needles;

FIG. 2A is an enlarged, vertical sectional view, partially broken away, and showing a portion of the cross head and a portion of the presser foot assembly of the machine shown in FIG. 1;

FIG. 7 is an enlarged vertical sectional view of the needle bar and push rod shown in FIG. 6;

FIG. 8 is an enlarged vertical sectional view showing a portion of the needle bar of the machine illustrated in FIG. 1, together with a pair of needles carried thereby;

FIG. 9 is an enlarged perspective view of the knife block of the machine shown in FIG. 1;

FIG. 10 is an enlarged fragmentary view of a portion of the needle plate and fabric in the tufting zone, the view looking upwardly from beneath the needle plate;

FIG. 11 is an enlarged vertical sectional view of the portion of the shearing mechanism, needles and needle plate of the tufting machine illustrated in FIG. 1, operating to sew yarn into the backing material;

FIG. 12 is a fragmentary perspective view of a portion of a modified form of presser foot assembly employed when a double face fabric is to be produced or the upper surface of the backing material is to be tufted;

FIG. 13 is an enlarged sectional view of the portion of the knives, knife blocks and mounting block of the machine shown in FIG. 1;

FIG. 14 is an enlarged fragmentary plan view of that portion of the machine illustrated in FIG. 13;

FIG. 15 is an enlarged fragmentary view of the lower surface of the shear plate and the end portion of the knives riding against the shear plate of the machine illustrated in FIG. 1;

FIG. 16 is an enlarged fragmentary rear elevational view partly in vertical section of several needles, the needle plate and shear plate, of the machine illustrated in FIG. 1, operating to sew yarns into the backing material;

FIGS. 18A through 18K are enlarged diagrammatic vertical sectional views of various types of pile fabric which are produced on the machine of FIG. 1;

FIG. 19A is a graph illustrating the yarn feed for a selected needle in typical cycle of the machine when producing double face fabric;

FIG. 19C is a graph illustrating a typical variation in air pressure in the needle bar of the machine in a single cycle when sewing single face fabric;

Figure 1:
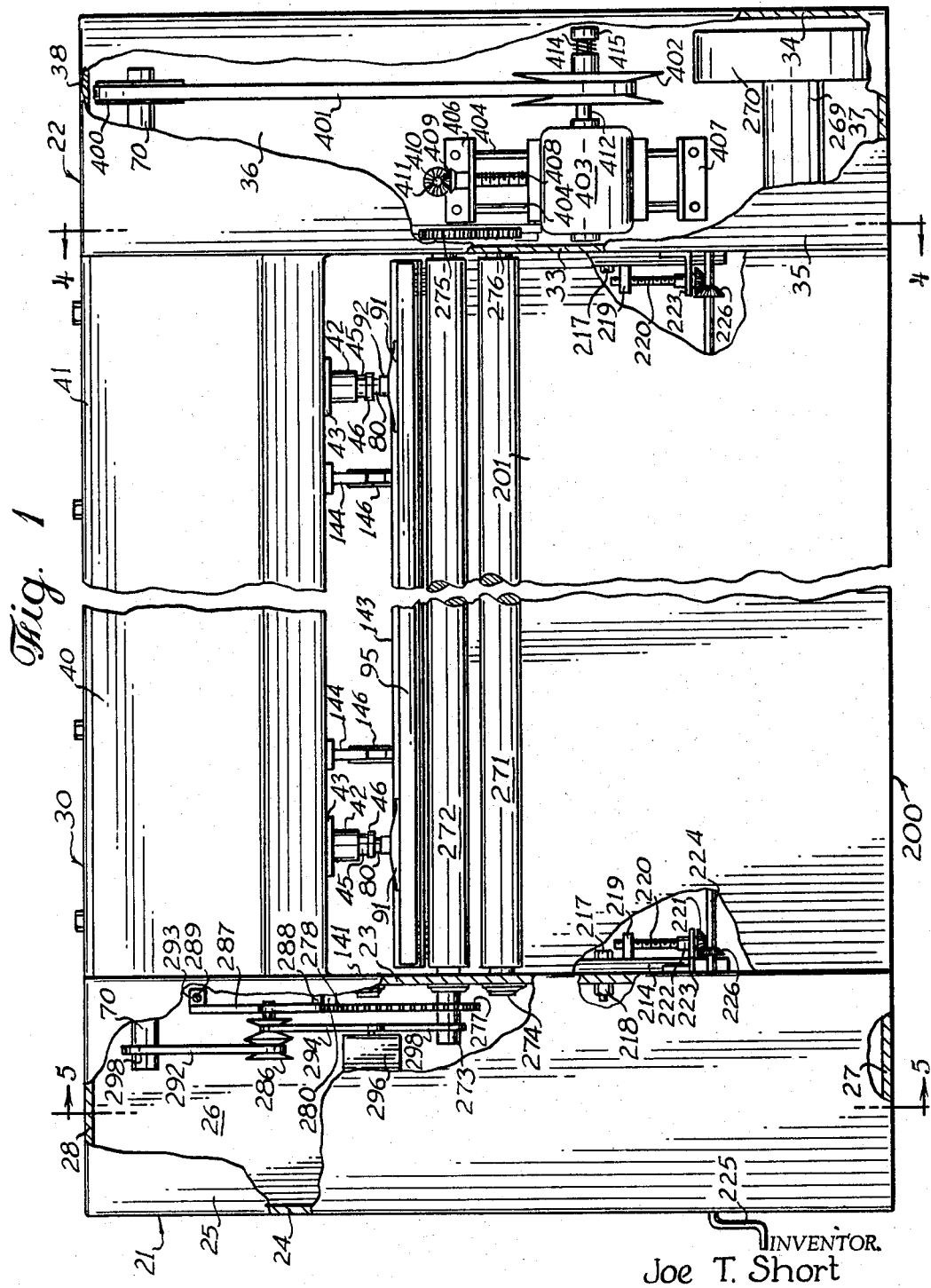
FIG. 1 is a front elevational view, partially broken away, of a multi-purpose tufting machine constructed in accordance with the present invention.

Referring now in detail to the embodiments chosen for the purpose of illustrating the inventive concept of the present invention, the main frame of the tufting machine, as best seen in FIG. 1, includes a pair of complementary, spaced, upright, tubular end members or stanchions 21 and 22, each of which is rectangular in cross-section and is closed at its upper and lower ends. Therefore, the end member 21 has spaced, parallel, inner and outer side panels 23 and 24, a front panel 25 and a back panel 26 which is parallel to the front panel 25. The end member 21 also includes a flat bottom 27 closing the lower end of member 21 and a flat top 28 closing the upper end of the member 21. In like manner, the end member 22 includes inner and outer side panels 33 and 34, a front panel 35, a rear panel 36, a bottom 37 and a top 38.

Extending between the upper portions of the inner panels 23 and 33 of the end members 21 and 22 is a cross head 30 which functions to house the main drive shaft 70 and the reciprocating mechanism for the needle bar 95 to be hereinafter described. The cross head 30 is a tubular member having a U-shaped cross head body 40 closed at its top by an access plate 41 or a plurality of such plates.

The lower portion of the cross head body 40 is flat, being horizontally disposed, and is provided with a plurality of spaced holes through which project a number of aligned valve housing blocks 42. Each housing block 42, as seen in FIG. 2, is a cylindrical member having an intermediate peripheral flange 43. Bolts 44 passing upwardly through the flange 43 secure the housing block 42 in place so that the upper portion of the block 42 projects into the lower portion of the cross head body 40 while the lower portion of the housing block 42 protrudes therebelow.

The housing block 42 is provided with a vertical bore, throughout its length, the bore receiving a push rod bushing 45 therein. The bushing 45 protrudes below the lower end of the housing block 42 and is provided with a cap 46 threadedly received thereon. The cap 46 maintains the packing 47 in place.

Centrally of the housing block 42, the bore which receives bushing 45 is enlarged to provide an air passageway 48 while the bushing 45, in the area of air passageway 48, is provided with a plurality of radially spaced holes or ports 45a through which air may pass from the air passageway 48 into the interior of bushing 45.

The block 42 is drilled from the back side, horizontally, toward the bushing 45 to provide a high pressure air chamber 49, and is drilled upwardly from the bottom along an axis which intersects the axis of the high pressure air chamber 49 to provide a hole or bore 50 which passes through the high pressure air chamber 49 for receiving the valve assembly 51. The lower end of bore 50 is closed by a plug 52 threadedly received therein.

The bore 50 is formed of descending diameters so as to provide a central air chamber 50a and, at the junction of the high pressure air chamber 49 and the central air chamber 50a, an annular valve seat 55, against which seats with pressure, a valve 56 of the valve assembly 51.

Angling downwardly and forwardly from the central air chamber 50a to the air passageway 48 is a second air passageway 53. It is, therefore, seen that a continuous air path is provided from the high pressure air chamber 49, via chamber 50a and valve seat 55, to air passageway 48 in the block 42. The outer end portion of the high pressure air chamber 49 is of enlarged diameter and is provided with internal threads which receive the external threads of a pipe or conduit 54 which leads from a source of compressed air, such as a compressor (not shown) or from a source of some other fluid under pressure, if desired.

Above air chamber 50a, the upper central rear portion of the housing block 42 is milled out to provide a transverse recess therein which is within the cross head body 40. Above the recess, the housing block 42 defines a rearwardly extending flange 57 which receives, therethrough, in axial alignment with the valve 56, a movable tappet 58. Connected to the valve 56 and extending upwardly therefrom to terminate at the lower end of the tappet 58 is a valve stem 59 which is provided at its upper end portion with a nut 60 retaining in place a spring plate 61. The lower end of the valve stem 59 is surrounded by an annular shaped plug or bearing 62 which is carried by block 42 between chamber 50a and the recess thereabove. The outer periphery of bearing 62 is grooved and receives a plurality of vertically spaced O rings or packing 62a. A coil spring 63, acting against the lower surface defining the recess in housing block 42, urges the spring plate 61 upwardly so as to seat resiliently the valve 56 on its valve seat 55. Upon downward movement of the tappet 58, the valve stem 59 will will be moved downwardly to move the valve 60 in a downward direction away from its valve seat 55 and thereby open the valve 50 so that air or other fluid under pressure from the high pressure air chamber 49 may pass, via chamber 50a and passageways 53 and 48, through the ports or holes 45a in the bushing 45.

In the upper central portion of the cross head body 40 is disposed a main drive shaft 70 which extends transversely of the feed of the backing material B. The end portions of shafts 70 protrude respectively through the inner panels 23 and 33 so as to terminate within the end members 21 and 22. The main drive shaft 70 is supported for rotation within the cross head 30 by means of a plurality of spaced pillow blocks, such as pillow block 71, seen in FIG. 2. The pillow blocks, in turn, are supported respectively on spaced ribs 71a which extend longitudinally of the feed of the backing material B from one side of the cross head body 40 to the other side thereof. Between respective adjacent pillow blocks, such as pillow block 71, the main drive shaft 70 is provided with eccentric cams, such as cam 72, which are respectively aligned with the bushings 45, each cam 72 being surrounded by a sleeve 73 on the upper end of a connecting rod 74. The connecting rod 74 protrudes downwardly and its lower end is pivotally connected, by means of a wrist pin 75, to a bifurcated connector 76, the wrist pin being carried between the arms 76a of connector 76. The lower end of the connector 76 threadedly receives therein a stub shaft 77 which protrudes downwardly therefrom. The stub shaft 77 is retained in place by a lock nut 78, the lock nut 78 carrying a conical downwardly protruding shield 79 concentrically on stub shaft 77. The stub shaft 77, however, protrudes below the shield 79 and is secured to and received within the upper end of a tubular push rod 80.

The push rod 80 is a straight hollow tubular member which is slidably received within the bushing 45, the push rod 80 being longer than the bushing 45 for protruding an appreciable distance through the cap 46 and below the bushing 45 and the housing block 42. The hollow central portion of the push rod 80 is provided with a transversely extending partition 81 which separates the tubular push rod 80 into an upper closed chamber 82 (for reducing the weight of the push rod 80) and a lower open chamber or fluid passageway 83 through which air or fluid may pass. Radially spaced holes 84 in the push rod 80, immediately below the partition 81, form a plurality of inlet ports which communicate at all times with the holes or ports 45a in the bushing 45. Therefore, any air or other fluid passing from air passageway 48 passes through ports 45a and 84 into the passageway 83. Each of the housing blocks 42 carries at one side of its flange 57 an upstanding bracket 85, the brackets being aligned and supporting for rotation a cam shaft 86 disposed parallel to and below the main drive shaft 70. Above each flange 57, the cam shaft 86 is provided with a cam 87 which acts upon the tappet 58 therein. A sprocket 88 on the main drive shaft 70 drives a continuous chain 89 which passes around a sprocket 90 on the cam shaft 86, the sprockets 88 and 90 being of the same diameter so that the cam shaft 86 is rotated in synchronization with and at the same speed as the main drive shaft 70. Each cam 87 is eccentric in shape and therefore acts downwardly upon its associated tappet 58 upon each revolution of the cam shaft 86. Thus, during a portion of each cycle of reciprocation of the push rod 80, the tappet 58, acting through its valve stem 59, opens its associated valve 56.

It will be understood that all push rods 80 are reciprocated at the same amplitude and that all push rods 80 terminate in a common horizontal plane protruding below the housing block 42. On the end of each push rod 80 is an air distribution manifold 91. Each air distribution manifold 91 is a rectangularly shaped block having a central upstanding tubular collar 92 split vertically along its rear portion at numeral 92a. Each air distribution manifold 91 also includes within its interior a downwardly opening air chamber 93 which communicates with the hole in collar 92. The collar 92 is received around the lower end of its associated push rod 80 and the split portion of the collar 92 receives a bolt 94 for clamping the collar 92 in place. It will be understood that all manifolds 91 are in spaced transverse alignment and that the lower surfaces of all air distribution manifolds 91 terminate in a common horizontal plane.

Below the air distribution manifolds 91 is a hollow needle carrier or needle bar 95. The needle bar 95 is U-shaped in cross-section, having a central portion milled out to define a flat rectangular upper plate 96 and a smaller flat rectangular lower plate 97 disposed in parallel relationship to each other and integrally joined along their rear edges by a rearwardly and upwardly extending flange 98. The front edges of the upper and lower plates 96 and 97 terminate in a vertical plane and receive thereon a removable front plate 100 having a gasket 101. Bolts 102 secure the front plate 100 in place. End plates, such as end plates 103, close the hollow needle bar 95.

The needle bar 95 is slightly shorter than the width between the inner panels 23 and 33 of the end members 21 and 22 and is received by its upper surface on the bottom surfaces of the air distribution manifolds 91. Cap screws 104 which extend downwardly through air manifolds 91 and into the upper plate 96 secure the needle bar 95 in place on the air distribution manifold 91. As will be seen in FIG. 2, the rear portion of the needle bar 95 is received on the air distribution manifolds 91 and, therefore, when viewed from one end, the needle bar 95 protrudes forwardly from the air distribution manifolds 91 so that the upper surface of the upper plate 96, forwardly of the air distribution manifolds 91, is readily accessible.

Below the air chambers 93 of the air distribution manifolds 91, the upper plate 96 is provided with a plurality of elliptical holes or ports 99, which are shown in FIG. 7, through which the air from the air manifold 91 may pass into the plenum chamber 105 defined by the plates 96, 97, 100, 103 and flange 98. Furthermore, upon reciprocation of the push rods 80, the needles bar 95 will be reciprocated in a vertical path over the backing material B.

As best seen in FIG. 8, a plurality of needles 110 extend vertically through the needle bar 95 and protrude therebelow. As is common in tufting machines, these needles 110 may be arranged in a single transverse row or in the plurality of parallel transverse rows in staggered relationship. In the drawings I have chosen to illustrate two rows of needles 110. Each needle 110 is an elongated hollow member which can be formed of one or several parts. In the embodiment chosen for the purpose of illustration, each needle 110 includes a central shank 111 having a small lower end portion 112, and a larger upper portion 113. The shank 111 has, at its upper end, a frustoconical upwardly converging shoulder 115. Above the shoulder 115 is an upper intermediate portion 116 which terminates at the cap 117 of shank 111. The cap 117 is of a diameter as large as, or larger than, the diameter of the larger upper portion 113 or shank 111 and is provided with a peripheral groove 118 for receiving an annular washer 119 therein. Above the peripheral groove 118, on the periphery of the cap 117, is a flattened portion forming a vertical recess which is adapted to receive the tip of a set screw. In the forward row of needles, each needle 110 has a front flattened recess 120, and in the rear row of needles, each needle 110 has a rear flattened recess (not shown) similar to recess 120.

The central portion along the axis of the cap 117 and the shank 111 of each needle 110 is bored to provide a straight uniform diameter, yarn passageway 122 throughout the length of the cap 117 and the shank 111. A plurality of radially spaced inwardly and downwardly converging air passageways 123 lead from the frustoconical shoulder 115 to the yarn passageway 122, the junction of the passageways 123 with the passageway 122 being in a plane below shoulder 115. It is, therefore, seen that the axes of the air passageways 123 form acute angles with the axis of the yarn passageway 122 for directing air or other fluid downwardly out of the needle 110. The outer portion of each air passageway 123 is of enlarged diameter, as seen at numeral 124, to permit the ready passage of air or other fluid to the air passageways 123.

The lower end of the yarn passageway 122 is counterbored to receive the upper end of a tubular needle element 125. The needle element 125 is a hollow cylindrical element having an interior diameter corresponding to the diameter of the yarn passageway 122 to which it is fitted. The tubular needle element 125 is press fitted by one end into the lower end portion 112 of shank 111 and protrudes downwardly therefrom. The upper or entrance end of the passageway 122 is belled out to provide a frustoconical downwardly tapered lip 127 which merges with the cylindrical portion of the passageway 122. The lower, or tip end, of the needle element 125 is beveled to provide an elliptical, rearwardly and downwardly opening, discharge end 128, provided at its lowermost portion with a rounded point or tip 129 and at its uppermost portion or neck with an arcuate yarn exit 130.

The tubular needle element 125 has a passageway 131 which is axially aligned with the yarn passageway 122 and forms an extension downwardly thereof. Thus, the passageways 122 and 131 form an uninterrupted open yarn channel in the needle 110 from the lip 127 to the inclined opening or discharge end 128.

For mounting the needles 110 on the needle bar 95, the upper plate 96 is provided with a plurality of circular holes 133 arranged in a pair of rows along the length of the upper plate 96, one row on the front and another row on the rear. The holes 133 of the front row are staggered with respect to the holes 133 of the rear row.

It will be observed that the front plate 100 of needle bar 95 terminates below the upper surface of the upper plate 96 so as to expose the upper front edge portion of the upper plate 96 throughout the length of the needle bar 95. This exposed front portion is provided with a plurality of internally threaded holes which are aligned with and extend inwardly toward the holes 133 for receiving respectively the front set screws 134 for locking the front needles 110 in place. In like manner, the rear portion of the upper plate 96 is drilled inwardly to provide spaced holes which threadedly receive the rear set screws 135 for locking the rear needles 110 in place.

The bottom plate or lower plate 97 is provided with a plurality of holes 136 which are respectively aligned vertically with the holes 133, the holes 136 being of a diameter approximately the same as or slightly larger than the diameter of the needle element 125 of needles 110. The upper portion of each of holes 136 is of an enlarged diameter which is approximately equal to or slightly larger than the diameter of shank 111. Thus, it is seen that each of the needles 110 may be received in one pair of the aligned holes 133 and 136, each needle 110 being provided with a packing 137 below its shank 111 and surrounding the upper end portion of the needle element 125. The set screws 134 and 135, when tightened after the needles 110 are received in the needle bar 95, retain the needles 110 in place. By loosening a selected set screw, an associated needle 110 may be readily removed by simply lifting same upwardly. From time to time the replacement of needles 110 may become necessary, because the tip or point 129 thereof becomes worn; however, breakage of needles 110 is rare, because the needles 110 are substantially larger in diameter than a conventional solid needle and the needles are cooled by air or other fluid which flows therethrough.

Figure 3:
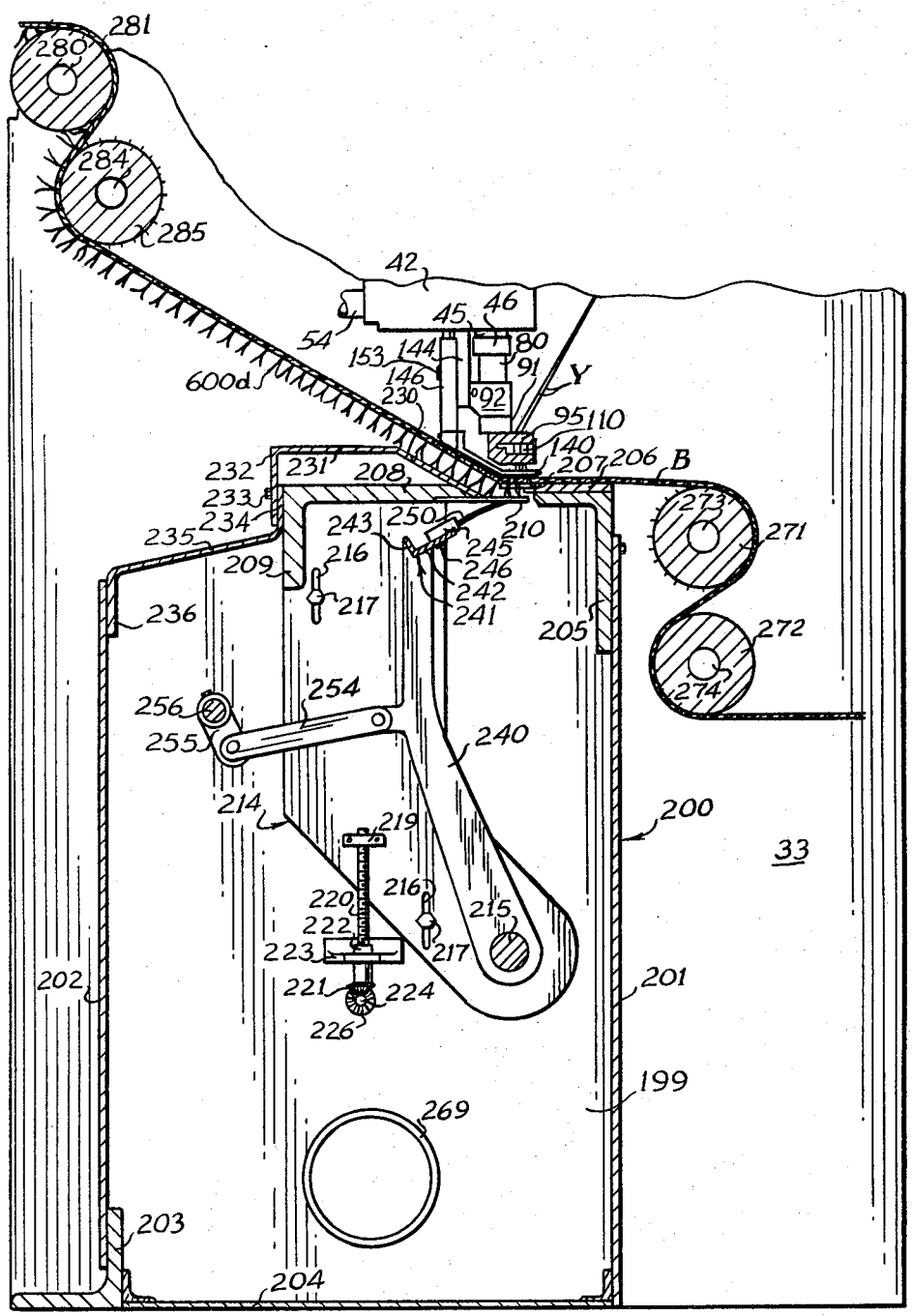
FIG. 3 is an enlarged fragmentary vertical sectional view of the lower portion of the machine shown in FIG. 1, and showing the cross bed with the shearing mechanism therein, as well as the backing material being fed by the feed rollers and a portion of the needle reciprocator assembly.

Below the needle bar 95 is a rectangular presser foot 140 which is best shown in FIGS. 2 and 3, the rear edge of which is connected integrally to an inclined upwardly and rearwardly extending slide plate 141. The presser foot 140 is provided with a plurality of holes 142 which correspond in spacing and arrangement with the needles 110 so that, upon reciprocation of a needle bar 95, the needles 110 will pass through the holes 142, respectively. The upper edge of the slide plate 141 terminates in an upwardly extending base member 143 which is disposed rearwardly of the path of travel of the needle bar 95 so as to not interfere with the reciprocation thereof.

In the event that a double face fabric is to be produced, the presser foot 140, slide plate 141 and base 143, shown in FIGS. 2, 3 and 11, should be modified to provide the presser foot assembly shown in FIG. 12. In FIG. 12 the presser foot 140a is provided with rearwardly opening parallel slots 142a, respectively aligned longitudinally with the needles 110. The forward ends of slots 142a are in staggered relationship corresponding to the staggering of needles 110, whereby the ends terminate respectively forwardly of needles 110 so that the needles 110 may respectively pass through the forward end portions of slots 142a.

The slide plate 141a is provided with slots 142b which are respectively aligned with and communicate with the slots 142a. Slots 142b also communicate with downwardly opening slots 142c in base 143a. It is therefore seen that a continuous guideway for the upper loops of yarns in backing material B' is provided, the slots 142c being longer than the loops produced in the backing material B' whereby the loops may readily pass therethrough.

Bolted to the bottom portion of the cross head body 40, as seen in FIG. 2A, and spaced between the housing blocks 42 are a plurality of presser foot support brackets 144. Each presser foot support bracket 144 is an L-shaped member having a base provided with slots 144a which are elongated longitudinally of the travel of backing material B and through which the bolts 145 pass for securing the bracket 144 in place on the bottom surface of the cross head body 40. The vertical portion of each bracket 145 faces rearwardly of the machine, extends downwardly and is received in the channel of an inverted T-shaped bracket 146.

The brackets 144 are each provided with a rearwardly extending bearing member 147 provided with a vertical hole through which an externally threaded shaft 148 protrudes. Each shaft 148 is threadedly received in a rearwardly extending tab 149 on the upper end of the shank 146a of T-shaped bracket 146. The shaft 148 is provided, at its upper end, with a cap 150, which bears against the upper surface of bearing member 147 and by means of which the shaft 148 may be rotated so as to raise and lower the bracket 146 respect to the bracket 144.

Below the bearing member 147, shaft 148 threadedly receives a lock nut 150a, which, when tightened against the lower surface of bearing member 147, locks the shaft 148 against further rotation. The shank of bracket 146 is provided with an elongated vertically disposed slot 151 which is aligned with a hole 152 in the bracket 144.

A bolt 153, threadedly received in the hole 152, is adapted to lock the two brackets 144 and 146 together, once the proper height of the bracket 146 is determined. The lower or base portion 146b of bracket 146, as seen in FIG. 12, is provided with laterally disposed slots, such as slot 146c, through which protrude bolts, such as bolt 146d. Bolts, such as bolt 146d, are threadedly received in the base member 143 or 143a of the presser foot assemblies.

It is now seen that the presser foot 140 or 140a is adjustable along three axes. By loosening the bolts, such as bolt 145, the presser foot 140 or 140a may be moved forwardly and rearwardly; by loosening bolts, such as bolt 153, and lock nut 150a, the shafts, such as shafts 148, may be manipulated as described above, to raise or lower the presser foot 140 or 140a; and, by loosening the bolts, such as bolt 146d, the presser foot 140 or 140a may be shifted transversely or laterally. Therefore, the holes 142 or 142a may be brought into quite accurate alignment with the needles 110.

Below the cross head 30 is the cross bed 200, best seen in FIG. 3. This cross bed 200 carries the shearing mechanism which will be described hereinafter. The cross bed 200 includes a front panel 201 and a rear panel 202 disposed parallel to each other between, and secured by their ends to, the inner panels 23 and 33 of the end members 21 and 22. At the lower end of the rear panel 202 is an angle iron or base bar 203, one flange of which rests upon the supporting surface and the other flange of which extends vertically. The vertically extending flange of base bar 203 overlaps the lower end of the rear panel 202. Extending between the vertical flange of the base bar 203 and the lower end of the front panel 201 is a base panel 204. At the upper end portion of the front panel 201, an angle iron or needle plate carrying bar 205 is provided, having a vertical downwardly extending flange which overlaps the upper portion of the front panel 201. It will be understood that the rearwardly extending flange of the needle plate carrying bar 205 terminates forwardly of and slightly below the needle 110 (FIG. 3).

Mounted on the rearwardly extending horizontal flange of the needle plate carrying bar 205 is the needle plate 206. The needle plate 206 is a flat rectangular plate, having a straight rear edge provided with evenly spaced slots within which are embedded the forward ends of the rearwardly extending vanes 207. The rearwardly extending vanes 207 are evenly spaced from each other and are in vertical alignment with the spaces between adjacent needles 110; whereby, upon reciprocation of the needle bar 95, the points of the needles 110 will be respectively moved into and out of the spaces between adjacent vanes 207.

The structure of the cross bed 200 thus far described is stationary, the front panel 201, the rear panel 202, the base bar 203, the base panel 204, and the needle plate carrying bar 205 being secured at their ends to the inner panels 23 and 33. Thus a plenum chamber 199 is provided which is open along its upper rear portion rearwardly of the vanes 207. A vertically movable shear mechanism is disposed within this plenum chamber 199, as will be described hereinafter. The shear mechanism includes an angle iron or shear plate carrying bar which extends from a position adjacent one inner panel 23 to a position adjacent the other panel 33. The shear plate carrying bar includes a horizontal flange 208 and a vertical flange 209 joined along a common edge. The horizontal flange 208 extends forwardly and is normally disposed in approximately the same plane with an in opposed relationship to the horizontal flange of the needle plate carrying bar 205, the forward end of the horizontal flange 208 terminating in spaced relationship but closely adjacent the rear ends of the vanes 207.

Protruding forwardly from the horizontal flange 208 is a shear plate 210 which terminates below and is parallel to needle plate 206. Shear plate 210 is provided with a plurality of holes or apertures 211 vertically aligned at all times with the needles 110. The holes or apertures 211 in the shear plate 210 are longitudinally elongated and are generally elliptical in shape, the forward terminus of each aperture 211 being inclined rearwardly and downwardly to define an acute angle at its bottom surface and being concaved so as to provide a concaved sharp shearing edge 212 in the shear plate 210. Along the upper surface of the shear plate 210 are a plurality of transversely spaced concaved yarn guide recesses 213 which are respectively aligned longitudinally along the path of travel of the backing material B with apertures 211, the yarn guide recesses 213 extending rearwardly therefrom. Thus, the forward ends of the recesses 213 merge with the forward extremity or shearing edge portions of the apertures 211, while the recesses 213, rearwardly of the apertures 211, gradually become more shallow until they merge with the upper surface of the shear plate 210.

The ends of the shear plate carrying bar are provided with downwardly and forwardly extending dog-leg shaped, complementary, opposed brackets 214 which terminate within plenum chamber 199 and form, with the shear plate carrying bar, a support frame for carrying the shear plate 210, the knife and rocker mechanism. In more detail, the forward end portions of brackets 214 carry, therebetween, a transversely extending pivot shaft 215 of the rocker mechanism, shaft 215 being disposed an appreciable distance vertically below the needles 110. Each of the brackets 214 is provided with a plurality of vertically elongated slots 216 through which protrude bolts 217 which are received through the inner panels 23 or 33 and are provided with nuts 218 within the end members 21 and 22, as seen in FIG. 1.

Intermediate the ends of the brackets 214, each bracket is provided with an inwardly extending lug 219 having internal threads. Lugs 219 threadedly receive, respectively, the vertically disposed, externally threaded lift shafts 220 which protrude downwardly below the brackets 214. The lower end of each shaft 220 is provided with a bevel gear 221 and a retaining ring 222 which sandwich therebetween a flange of an angle bracket 223. The angle bracket 223, in turn, is mounted on the inner panel 23 or 33, adjacent the bracket 214.

Below the two bevel gears 221, a common positioning shaft 224 extends, the shaft 224 being journaled by the inner panels 23, 33 and the outer panel 24. Shaft 224 protrudes outwardly of panel 24 and is provided with a crank 225, by means of which the shaft may be rotated. On shaft 224 are a pair of spaced bevel gears 226 which respectively mesh with bevel gears 221 so that upon rotation of crank arm 225, the shafts 220 will simultaneously be rotated for raising the brackets 214 in unison or lowering the same, as desired, thereby raising or lowering the shear plate carrying bar and the shear plate 210.

Extending upwardly and rearwardly from the front beveled edge of the horizontal flange 208 of the shear plate carrying bar is an inclined deflector plate or slide plate 230 which is approximately parallel to and below slide plate 141 and merges with a horizontal, rearwardly extending plate 231. The rear edge of plate 231 is turned downwardly to provide a vertical support plate 232. The angle of inclination of the deflector plate 230 corresponds to the incline of slide plate 141, the deflector plate 230 being disposed rearwardly of the slide plate 141 so as to provide an inclined passageway for the tufted backing material B, as will be explained hereinafter.

The support plate 232 is secured to the rear face of the vertical flange 209 by means of bolts 233. Sandwiched between the flange 209 and the support plate 232 is the upper flange 234 of a Z-shaped cover plate 235, the cover plate 235 having a rear downwardly extending flange 236 which overlaps and rides against the inner surface of the rear panel 202, adjacent the upper edge thereof. Thus, the plenum chamber 199 of the cross bed assembly hereinabove described is essentially closed by the shearing mechanism thus far described.

The pivot shaft 215, as mentioned above, extends between the downwardly and forwardly extending brackets 214. At spaced intervals along the length of the pivot shaft 215, the shaft is journaled by bearings (not shown) which, in turn, are supported by additional support brackets (not shown) connected to the flanges 208 and 209 intermedite the ends thereof. Between each pair of brackets 214 and the other support brackets (not shown) the pivot shaft 215 carries for pivotal movement upstanding dog-leg shaped rocker arms such, as rocker arm 240. Carried by the upper ends of all rocker arms 240 for reciprocatory movement in an arcuate path about the shaft 215 is a knife block support cable 241. The support cradle 241 is a upwardly open angle iron which includes a forwardly and upwardly extending knife block support flange 242 and an upwardly and rearwardly extending stop flange 243. The stop flange 243 and the support flange 242 are disposed perpendicularly to each other and are joined along a common edge.

At spaced intervals along its length, the support flange 242 is milled out to provide a plurality of equally spaced longitudinally extending recesses 244, within which are respectively received the knife blocks 245. The knife blocks 245 are, therefore, disposed in juxtaposed alignment transversely across th cross bed 200. Each knife block 245 is retained in place by a bolt 246 which extends up through an elongated slot 247 in the support flange 242. The slots 247 are parallel to and terminate within the recesses 244 and therefore by loosening bolts 246 the position of the knife block 245 may be altered so as to move each knife block 245 either forwardly or rearwardly, as desired. The bolt 246 of each knife block 245 is received threadedly in a hole 248 in the rear portion of the knife block 245. Each knife block 245, as best seen in FIG. 9, is a rectangular member which stands above the support flange 242 and is provided with a open ended slot 249 disposed at a slightly acute angle with respect to the parallel lower and upper surfaces of the block 245. Each slot 249 receives therein one end portion of a flat knife blade or knife 250, the knives 250 of adjacent slots 249 being sufficiently wide to overlap each other, as illustrated in FIG. 13. As assembled, the knives 250 are disposed in an angular relationship to the support flange 242 and are parallel to each other, the edge portions thereof overlapping each other and being spaced from each other by short distances.

The cutting edge 253 of each knife 250 is a straight edge, beveled on its lower surface and angling across the front of the knife 250. The edge 253 terminates at the forward point 251 at the lower edge of the knife and a rear corner 252 at the junction of the cutting edge 253 and the upper side edge of the knife 250. Each knife block 245 is disposed immediately below the shear plate 210, while the knives 250 protrude an appreciable distance in a forward and upward direction from the knife blocks 245 so as to be flexed downwardly by and ride against the shear plate 210 with their respective cutting edges 253 disposed flat against the bottom surface of the shear plate 210. Each knife 250 is approximately equal in width to slightly more than the distance between three apertures 211 and, therefore, upon each reciprocation of the rocker arms 240 passes across three of these apertures. Since the knife edges 253 ride upon the lower surface of the shear plate 210 at all times, the movement of the knives 250 creates a self sharpening effect so as to maintain the edges 253 in sharpened condition for an extended period of time.

Referring again to FIG. 3, it will be seen that, intermediate the ends of each of the rocker arms 240 and pivotally connected thereto are the link arms, such as link arm 254, the rear ends of which are connected to the ends of axially spaced, radially extending, actuator levers, such as lever 255, on a rock shaft 256 disposed parallel to shaft 215. The rock shaft 256 is journaled by the inner panels 23 and 33 and protrudes beyond the inner panel 33.

Figure 4:
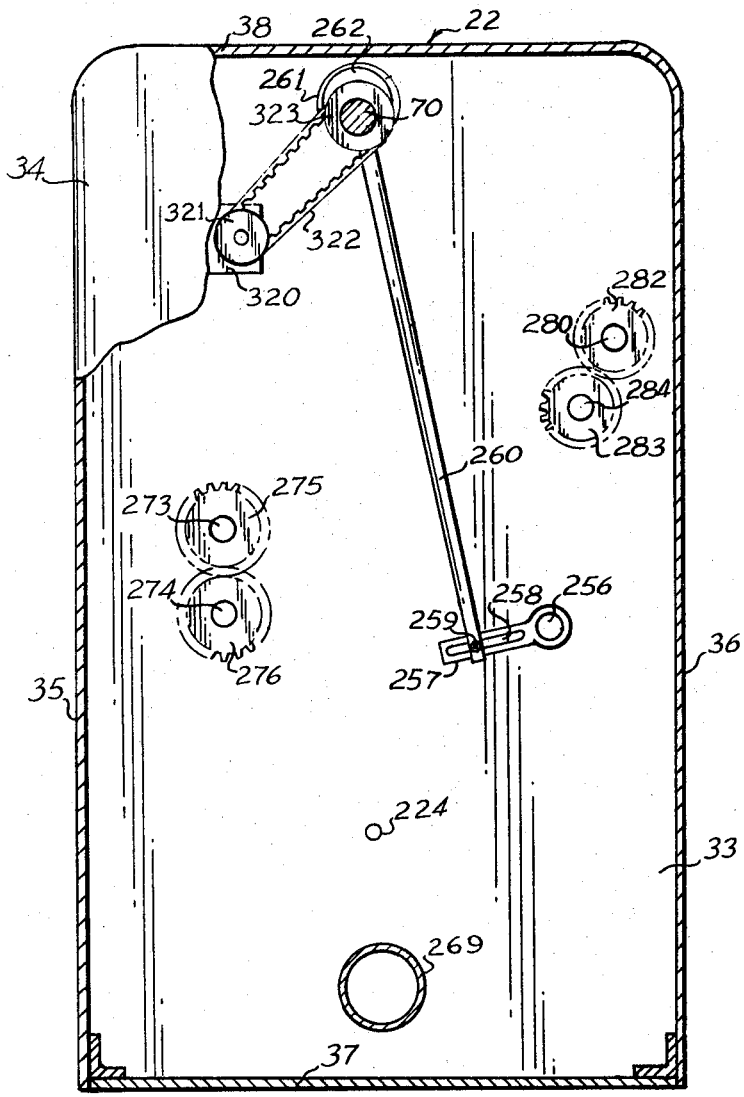
FIG. 4 is a vertical sectional view taken substantially alone line 4—4 in FIG. 1.
Figure 17:
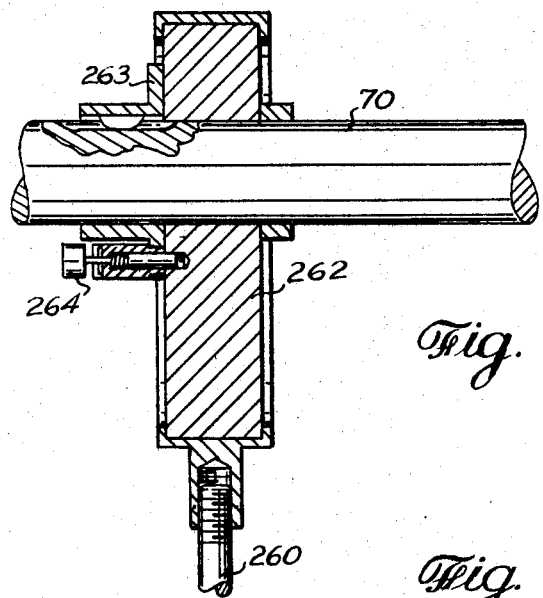
FIG. 17 is an enlarged sectional view of the eccentric cam and clutch mechanism on the main drive shaft for actuation of the shearing mechanism.

As best in FIG. 4, the outer end of rock shaft 256 is provided with a lever 257, having a radial slot 258 therein. Through slot 258 projects a pivot pin 259, the position of which may be varied along the length of slot 258. The pivot pin 259 receives one end of a pitman 260 which extends upwardly and is provided at its upper end with a bearing 261 which surrounds an eccentric cam 262. As best seen in FIG. 17, the cam 262 is rotatably carried by the main drive shaft 70 so that the main drive shaft 70 may rotate freely in the cam 262. A clutch plate 263 is disposed adjacent the cam 262 and is keyed to the shaft 70 so as to rotated thereby at all times. The clutch plate 263 carries a detent or a retractable pin 264 which is adapted to project into an appropriate aperture or hole in the cam 262 so that when the pin 264 is in its engaged position within the hole, it will cause the cam 262 to be rotated with the clutch plate 263. On the other hand, when the pin 264 is withdrawn, the clutch plate 263 will continue its rotation but the cam 262 will remain stationary.

From the foregoing description, it will be understood that the pitman 260 is reciprocated upon rotation of the main drive shaft 70, provided the pin 264 is engaged. The reciprocation of the pitman 260 will move the lever 257 upwardly and downwardly thereby rocking the rock shaft 256, first in one direction and then in the other. The lever 255 on the rock shaft 256 will move the link arms, such as link arm 254, back and forth, thereby causing the rocker arms, such as rocker arm 240, to be pivoted back and forth about the pivot shaft 215. Thus, the knives 250 will be moved back and forth across the bottom surface of the shear plate 210 in timed relationship to the reciprocation of needles 110 so as to cooperate with the apertures 211 therein and the shearing edges 212 to shear any loops of yarn Y which protrude through the apertures 211.

An exhaust blower 270 is provided in the end member 22 and communicates, via intake conduit 269, with the plenum chamber of cross bed 200. Upon actuation of the blower 270, a partial vacuum will be drawn within the plenum chamber of cross bed 200 and the air within the cross bed 200 will be reduced to a sub-atmospheric pressure condition.

Figure 5:
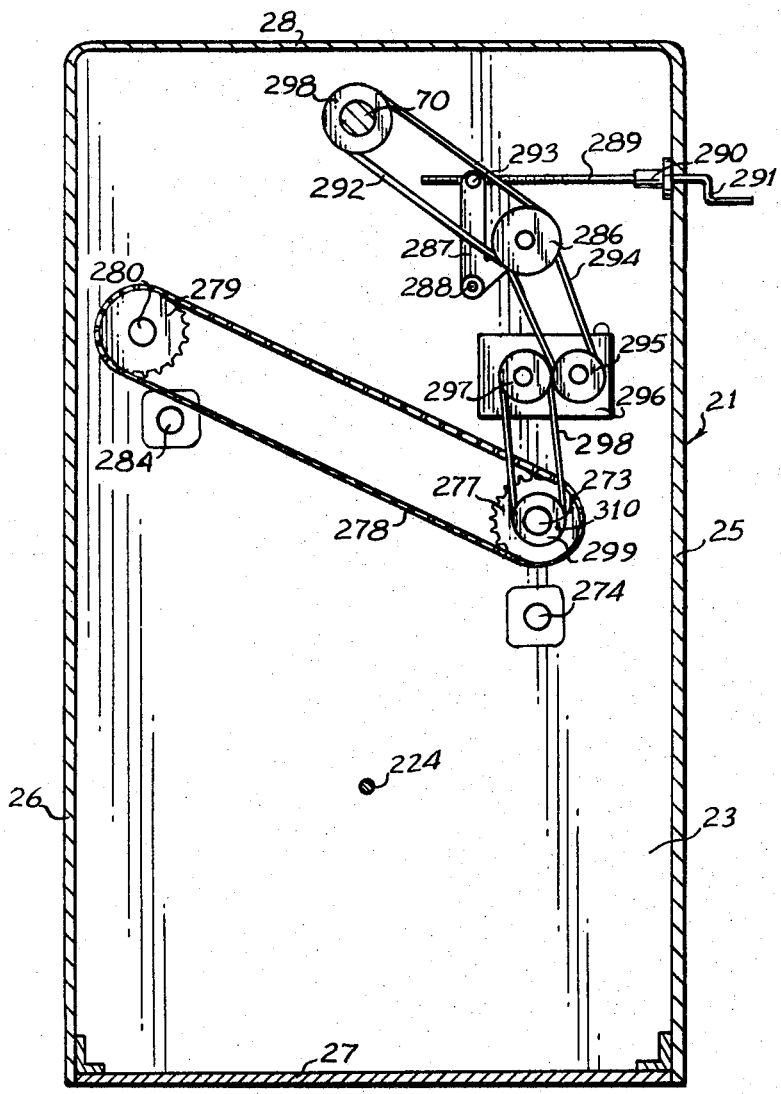
FIG. 5 is a vertical sectional view taken substantially along line 5—5 in FIG. 1.
Figure 6:
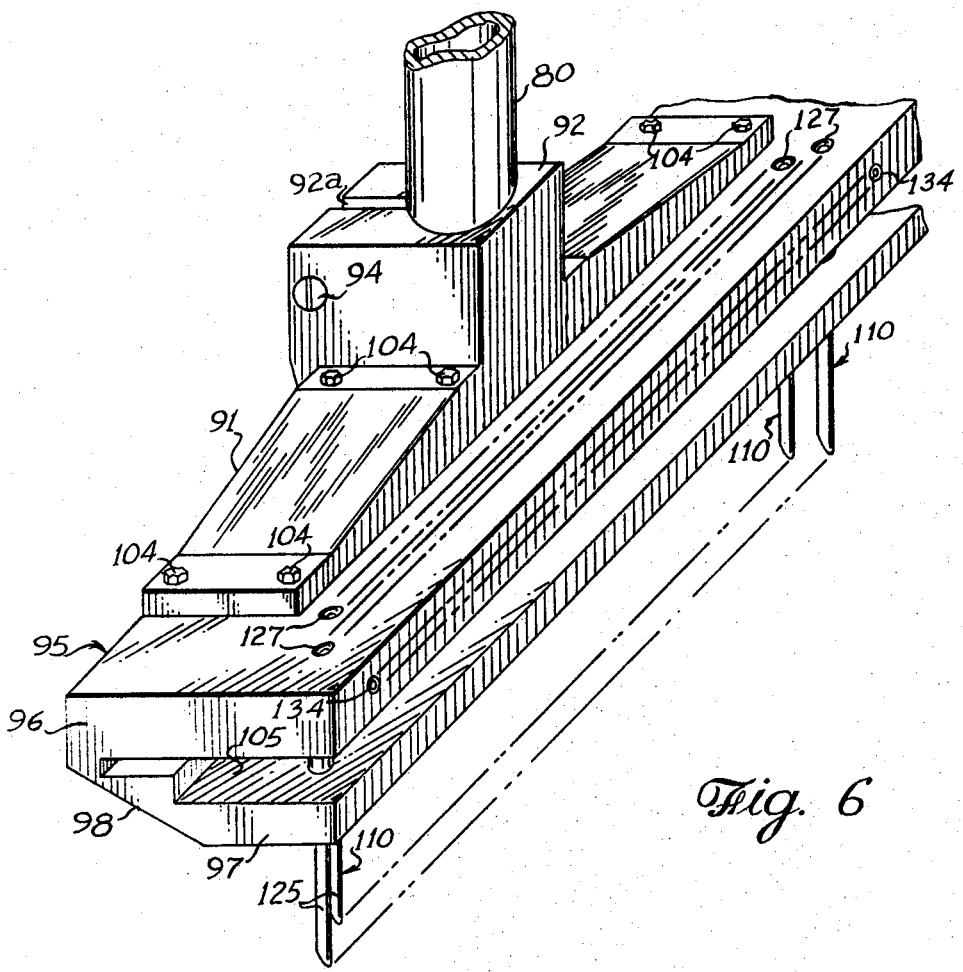
FIG. 6 is an enlarged fragmentary perspective view of a portion of one of the hollow push rods, the needle bar and needles of the machine shown in FIG. 1, the front plate and end plate of the needle bar being removed to show the interior thereof.

For moving the backing material B across the cross bed 200 and beneath the needles 110 and the needle bar 95, the tufting machine is provided with a pair of infeed rollers 271 and 272 on the front of the machine. The infeed rollers 271 and 272 are mounted one above the other and are carried on shafts 273 and 274, respectively. These shafts 273 and 274 are provided with intermeshing gears 275 and 276 at one end, as shown in FIG. 4, so that the infeed rollers 271 and 272 are rotated in synchronization with each other but in opposite directions. The shaft 273 of upper infeed roller 271 is provided, within the end member 21, with a sprocket 277, around which is passed a continuous chain 278, the chain 278 extending in an upwardly and rearwardly direction and passing around a sprocket 279 on a shaft 280, as seen in FIG. 5.

Shaft 280 is in the rear of the machine and is above the shaft 273 of rollers 271. Shaft 280 carries the upper outfeed roller 281 between, and is journaled in, the inner panels 23 and 33 with its ends protruding respectively into end members 21 and 22. In the end member 22, the shaft 280 is provided with a gear 282 which meshes with a gear 283 on shaft 284. The shaft 284 is journaled below and parallel to the shaft 280 by the inner panels 23 and 33 and carries an outfeed roller 285. Thus, the outfeed rollers 281 and 285 are rotated in synchronization with each but in opposite directions.

The backing material B passes under the infeed roller 272 and thence up between the infeed rollers 271 and 272 passing over the outer periphery of the roller 271.

Thereafter, the backing material B passes across the needle plate 206, passing beneath the needles 110, around the presser foot 140 and upwardly between the slide plate 141 and deflector plate 230. Thence, the backing material B passes around the outer portion of the periphery of the roller 285, between the rollers 281 and 285 and around the inner portion of the periphery of the roller 281. The peripheral speed of rollers 281 and 285 is slightly greater than the peripheral speed of rollers 271 and 272 so that the backing material B is urged upwardly against presser foot 140 and slide plate 141 as it is moved through the machine.

For driving the infeed rollers 271, 272 and the outfeed rollers 281 and 285 from the main drive shaft 70 at a variety of speeds so as to establish a preselected number of stitches per inch to be sewn into the backing material B, a variable speed drive mechanism is provided, as seen in FIG. 5. This variable drive mechanism includes a conventional pair of variable diameter pulleys 286 carried by one end of a bell crank 287. The central portion of the bell crank 287 is pivotally carried by a pivot pin 288 mounted on inner wall 23 within the end member 21. The free end of the bell crank 287 protrudes upwardly and carries a pivotally mounted internally threaded lug 293 which receives the external threads of an adjustment rod 289.

The adjustment rod 289 protrudes through front panel 25, being journaled for swirling by a bearing 290 therein. The outer end of rod 289 is provided with a stitch spacing control crank 291 by means of which the rod 289 is manually rotated for pivoting the bell crank 287 about a pivot pin 288.

A belt 292, which passes around and is driven from a pulley 298 on shaft 70, also extends around one of the pulleys of the pair of pulleys 286 while a second belt 294 passes around the other pulley of the pair of pulleys 286 and around input pulley 295 of a gear reducer 296. The gear reducer 296 materially reduces the speed of rotation of an output pulley 297 thereon, with respect to the input pulley 295. Output pulley 297 drives a belt 298 which, in turn, drives a pulley 299 on shaft 273.

Therefore, by manipulation of stitch spacing control crank 291, the ratio of the speed at which backing material B is passed through the machine with respect to the reciprocation of needles 110, i.e., the stitch rate (number of tufts per inch) may be readily and easily varied, as desired.

In the forward, upper portion of the machine, as seen in FIG. 2, is the yarn control mechanism 300 which may be any of a variety of such mechanisms. These mechanisms feed varying amounts of yarn to the needles of a tufting machine and may either function to positively feed to the yarn or to selectively arrest the feeding of the yarn to the needles. Such yarn control mechanisms are well known and any of a wide variety of such mechanisms may be used with the machine of this invention. In the present embodiment, I have illustrated a notch bar yarn feed mechanism 300, sometimes known as a "slat attachment" having opposed bar elements. One element includes a plurality of spaced slats or bars 301 carried in a continuous lower closed path by chains, such as chain 302, so as to intermesh, along a short horizontal path, with notched bars 303 of the other element, bars 303 being carried in a continuous closed upper path by chains, such as chain 304. The chains 302 and 304 are carried on sprockets 305, 306, 307 and 308 in their parallel paths while sprockets, such as sprocket 309, hold the chains 302 and 304 in their prescribed paths. The sprockets 305, 306, 307 and 308 are carried by shafts 310, 311, 312 and 313, respectively, the shafts being appropriately journaled by the inner panels 23 and 33. It will be understood by those skilled in the art that the two bar elements are movable toward and away from each other so as to provide for more or less intermeshing of bars 301 and 303.

A plurality of yarns Y from a creel (not shown) are passed between the intermeshing bars 301 and 303 and thence, in generally downward directions toward the needle bar 95 for being received, respectively, in and threaded through the needles 110. If a multi-color effect is to be produced, two or more yarns Y may be passed to the passageway of a single needle 110.

As best seen in FIG. 1, the main drive shaft 70 is provided with a pulley 400 which is driven by a continuous belt 401, via a variable diameter pulley 402 from an electric motor 403. The motor 403 is slidably carried by a pair of parallel rods 404, the ends of which are supported by brackets 406 and 407. The brackets 406 and 407 are mounted on the back panel 36 so as to dispose the rods 404 vertically. A positioning shaft 408 protrudes through and is journaled by the central portion of bracket 406, the positioning shaft 408 being provided with external threads which are threadedly received by the base of motor 403 so that the motor 403 may be moved up and down upon rotation of the shaft 408 in one direction or the other. A bevel gear 409 is provided on the upper end of the shaft 408 and meshes with a bevel gear 410 on the inner end of a crank shaft 411. The crank shaft 411 protrudes outwardly through the back panel 36 so that it may be manually manipulated for raising and lowering the motor 403.

The variable diameter pulley or variable pitch sheave 402 is mounted on the shaft 412 of the motor 403 and the outer movable disc of pulley 402 is continuously urged toward the fixed disc of pulley 402 by a coil spring 414 which surrounds the shaft 412 outwardly of pulley 402. A cap 415 on the end of shaft 412 maintains the spring 414 in compression, acting against the pulley 402. Since the length of the belt 401 is fixed, the raising and lowering of the motor 403 will cause the belt 401 to urge the discs of the pulley 402 apart when the motor 403 is moved downwardly. On the other hand, as the motor 403 is moved upwardly, the spring 414 urges the outer disc of the pulley 402 inwardly, thereby urging the belt 401 outwardly. This increases the effective diameter of pulley 402. It is, therefore, seen that, by the manipulation of the shaft 411, the effective diameter of pulley 402 may be varied, as desired. Hence, the speed at which the belt 401 is driven by the motor 403 i.e., the speed at which the pulley 400 is rotated on shaft 70 is varied, thereby varying the speed of the machine.

For actuating the yarn control mechanism 300, a gear reducer 320 is provided on the inner panel 33 of the end member 22, as seen in FIG. 4. This gear reducer 320 is provided with an input pulley 321 which is driven by a belt 322 passing around a pulley 323 on the main drive shaft 70. The gear reducer 320 is connected in the conventional way to the yarn control mechanism 300 so as to drive the chains 302 and 304 at an appreciably reduced speed in opposite directions from shaft 70. Since the yarn control mechanism 300 is driven from the main drive shaft 70 and the reciprocation of needle 110 is controlled by shaft 70, yarn control mechanism 300 is driven in timed relationship to the reciprocation of the needles 110. It will be understood by those skilled in the art that, from time to time, it is necessary to alter the position of the chains 302 and 304 with respect to each other so as to permit more or less meshing of the notched bars 301 and 303. Therefore, the drive arrangement between the gear reducer 320 and the yarn control mechanism 300 should be such as to permit this adjustment.

Figure 19B:
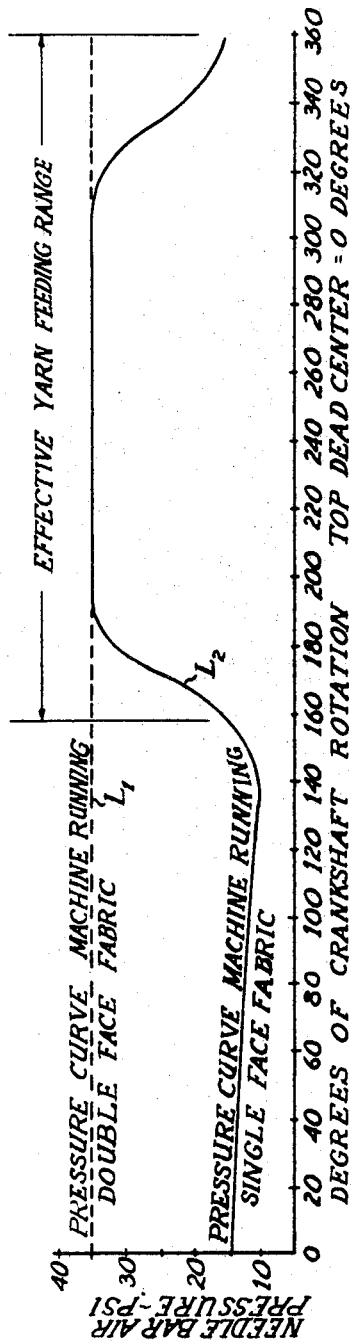
FIG. 19B is a graph illustrating the yarn feed for a selected needle in a typical cycle of the machine when producing single face fabric.
Figure 19D:
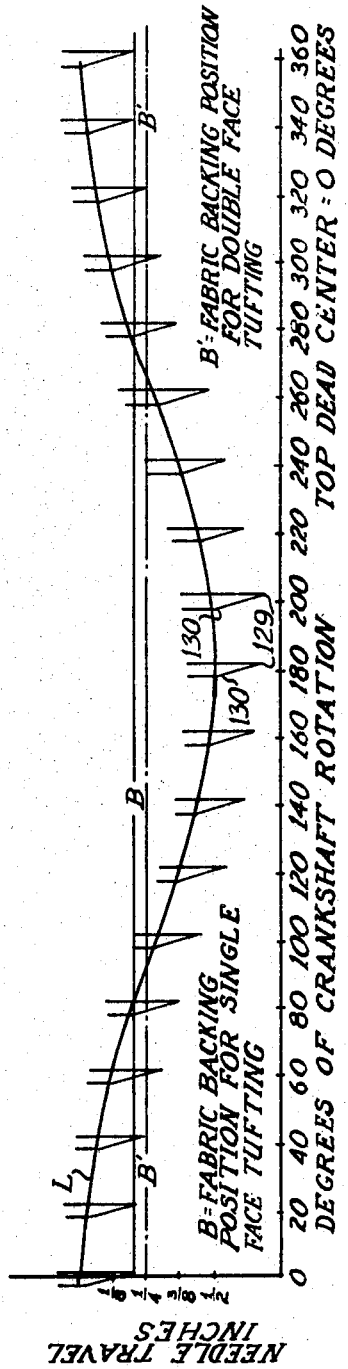
FIG. 19D is a graph illustrating the reciprocation through a single cycle of the needles when sewing double face fabric and when sewing single face fabric.

Referring now to FIGS. 19A through 19D wherein the timing of a typical machine is illustrated, it will be understood that in the event a single face or double face fabric is to be produced, the position of the needle bar 95 is adjusted by loosening bolts 94 and moving the air distribution manifolds 91 upwardly or downwardly on push rods 80 so as to arrange the needles 110 to penetrate the backing material B at the time in the cycle of the machine indicated by FIG. 19D. In other words, if a single face fabric is to be produced, the tip 129 of each needle 110, as seen in FIG. 19D, is arranged to commence penetration of the backing material B at approximately 20 degrees from its top dead center position and be withdrawn from the backing material at approximately 340 degrees. When a double face fabric is to be produced, the position of the needle bar 96 is raised so that the tip 129 of each needle 110 commences penetration of the backing material B' at a later time, for example, at approximately 60 degrees from top dead center and be withdrawn at approximately 300 degrees from top dead center. The needles 110, however, do not complete penetration of the backing material until the yarn exits 130 commence penetration of the backing material B or B' which is approximately 80 degrees later in the stroke of the needles 110. The line L in FIG. 19D indicates the travel of the yarn exit 130 of a needle 110 through a stroke of ½ inch.

In FIG. 19C, if a double face fabric is to be produced, line L indicates that, in a typical operation of the machine, sufficient air is introduced to create a pressure of approximately 35 p.s.i. in the needle bar 95. This approximate pressure is maintained throughout the time the needles 110 are sewing; however, it will be understood that the pressure does vary when the needles 110 pass through the backing material B'. The selected air pressure, of course, may be varied, as desired and such things as a variation in speed of the machine and the characteristics of the yarn Y, as well as the character of the pattern may make it desirable to use different air pressures.

When a single face fabric is to be produced, the air pressure is varied according to the position of the needles 110. In a typical operation, the air pressure will be varied according to line $L_2$ in FIG. 19C. Line $L_2$ indicates that, in a cycle of the machine, the air pressure within needle bar 95 is varied from approximately 10 p.s.i. to approximately 35 p.s.i. The pressure build up is commenced at 140 degrees by the opening of valve 56 and reaches a plateau of 35 p.s.i. at approximately 190 degrees, the 35 p.s.i. pressure being maintained to approximately 310 degrees, at which time the valve 56 is closed. Thereafter, the pressure rapidly drops in needle bar 95 to approximately 15 p.s.i. and then continues a gradual drop until the valve 56 is again opened. The effective yarn feeding range for the single face fabric is from approximately 158 degrees to approximately 360 degrees. Surprisingly, the yarn may be fed by the air pressure for creating a loop, even after the needle 110 is withdrawn from the backing material B since a hole remains in the backing material B, as a result of the hollow needle 110, even after it is withdrawn.

The amount of yarn feed for a loop of the single face fabric, of course, is dictated by the yarn control mechanism 300; however, taking a typical needle 110, the yarn is fed at a relatively uniform rate, as indicated by the slope of line $L_3$ in FIG. 19B, the rate of feed increasing toward latter part of the cycle. From 0 degrees to approximately 140 degrees the yarn feed is sufficient to form the backstitch; however, from approximately 140 degrees to 360 degrees the yarn feed to the needle 110 is for the loop to be formed. If loops are to be cut, the knives 250 are arranged to cut during the period in which the needles 110 are out of the backing material B. Thus preferably the cutting of the bight portion of a loop should take place from approximately 320 degrees of one cycle to 40 degrees of the next subsequent cycle. By such an arrangement, the knives 250 accomplish their cut only after a full length loop is produced and during the period in which yarn, essentially only sufficient for the stroke of the needle 110, is fed thereto.

As illustrated in FIG. 19B, a total of 1½ inches of yarn is fed to a needle 110 during one cycle which would provide a loop having a height of approximately 11/16 inch, assuming that ⅛ inch of the yarn fed were utilized for the back stitch.

In the graph of FIG. 19A the yarn feed for a typical needle when it is desired to produce a double fabric is illustrated. The lines $L_4$ and $L_6$ illustrate the yarn fed to a needle 110 for forming the upper loops and the line $L_5$ illustrates the yarn fed for forming a lower loop or tuft. In FIG. 19A, approximately 7/16 inch of yarn is fed for forming an upper loop and approximately 7/8 inch of yarn is fed for forming a lower loop. If it is desired to cut the lower loop, the cutting operation should be accomplished between 280 degrees of one cycle and 20 degrees of the next subsequent cycle.

It is therefore, seen that the yarn feed for both the upper loop and the lower loop is in excess of the stroke of a needle 110 and that when a loop is cut, the differential pressure which holds the loop extended may result from the air fed through the needle 110 and through a hole in the backing material B or simply from the vacuum created by blower 270. Indeed, once the loop is deposited in aperture 211, it may be cut by knife 250, regardless of whether or not differential air pressure is acting upon the loop.

OPERATION

From the foregoing description the operation of the tufting machine should be apparent. First, the machine is provided with backing material B from a roll (not shown), the backing material being fed around the infeed rollers, and then across the machine to and around the outfeed rollers, as illustrated in FIG. 2.

In producing the double face fabric, the backing material B′, which I prefer to use for this double face fabric, includes a woven nylon net 500 which is impregnated with polyurethane foam 501. The foam 501 tends to glue or adhere the strands of yarn Y passing through the woven nylon net 500 in place so that the loops will not be pulled out of the backing material B′.

Thereafter, the yarns Y are fed from a creel (not shown) through the yarn control mechanism 300 and thence to the needles 110. Each yarn passes through the channel defined by the yarn passageway 122 and the passageway 131. Each yarn Y then passes out of its yarn exit 130 and is led rearwardly of the machine.

Air or some other fluid under pressure is fed at a pressure of approximately 35 p.s.i., via the various conduits, such as conduit 54, so that fluid under pressure is supplied to the high pressure air chamber 49 of each valve housing block 42. In setting up the machine, the height of presser foot 140 is adjusted for variation in thickness of the backing material B or B′. The position of the needle bar 95 is adjusted, as described above, for sewing either the double face fabric or the single face fabric. The stitch rate is set by manipulation of crank 291. The speed at which the machine is to operate is set by manipulation of shaft 411 and the height at which the loops are to be sheared is set by manipulation of crank arm 225.

In operation, when the valves, such as valve 56, are opened, the air passes from the high pressure chambers, such as chambers 49, through the chambers, such as chambers 50a, and thence through the air passageways, such as air passageways 53, to the air passageways, such as air passageway 48, and then past the ports in bushing 45 and then through the ports in push rods 80, passing downwardly through the fluid passageway, such as fluid passageway 83, into the air chambers, such as air chamber 93 of the air manifolds 91. Thence, the air passes through the holes in the upper plate 96 and into the plenum chamber 105 whence it passes through the air passageways 123 into the yarn passageway 122 of each of the needles, thereby urging the yarns Y in a downward direction and out of the yarn exit 130.

In order to set the loop shearing height, i.e., shear plate 210 at the proper height for cutting loops, the bolts 217 are loosened before the crank arm 225 is manipulated for either raising or lowering the shearing mechanism. It will be remembered that the shearing mechanism includes the support frame which carries the rocker mechanism, as well as the deflector plate or inclined slide plate 230. Thus, since the knives 250 are carried with the shear plate 210, there is no need to readjust the knives 250 each time the shearing mechanism is changed in its vertical position. Since the shearing mechanism carries with it the deflector plate or slide plate 230, the proper spacing between the inclined slide plate 141 and the inclined deflector plate or slide plate 230 is also established by manipulation of crank arm 225. Any further adjustment of the spacing between plates 141 and 230 is accomplished by adjusting the height of the presser foot 140.

It is now seen that, depending upon the amount of yarns Y supplied by the yarn mechanism 330, the air will urge the yarns Y out of the needles 110 and hold the yarns Y in an extending condition.

Since air or fluid under pressure urges the yarns Y out of the needles to the full extent permitted by the yarn control mechanism 300 after penetration of the backing material B by the needles 110, the needles are provided with a short stroke, only sufficient to insert the tufting ends 128 slightly below the backing material B. Furthermore, at all times, the lower surface of the shear plate 210 is below the position of maximum penetration of the needles 110 and hence there is no danger of the knives 250 engaging the needles 110. Indeed, in most instances, the shear plate 210 is spaced well below the position of maximum penetration of the needles 110 and cuts only those loops which are discharged from needles 110, i.e., elongated by the differential fluid pressure as the differential fluid pressure holds the yarns extended downwardly into the apertures 211 in shear plate 210, with their bight portions protruding outwardly below the lower surface of shear plate 210. It is preferably, however, that the stroke of the knives 250 be arranged for shearing or cutting action of knives 250, after the needles 110 are retracted.

When producing cut pile, it is desirable that the exhaust blower 270 be operated so as to create a partial vacuum in plenum chamber 199 of the cross bed 200. It will be understood that when a partial vacuum is drawn in the plenum chamber 199 of the cross bed 200, air will be drawn through the backing material B, which extends substantially across the cross bed 200, and will also be drawn through the inclined passageway defined by the deflector plate 230 and the inclined slide plate 141. This tends to clean the yarn Y after it has been tufted and clean the backing material B, as well as direct air downwardly through the apertures 211 in the shear plate 210 and thereby tend to guide, in cooperation with the air which may be discharged from the needles 110, the yarns Y into the apertures 211 so that they may be sheared by the reciprocating knives 250. The blower 270 also carries away the lint from the machine. If a porous bag (not shown) is placed over the discharge end of the blower 270, the lint may be easily collected in the bag.

Through the control of the feed of the yarns Y, the control of the air passing through the needles 110 and the positioning of the shearing mechanism, a large variety of tufted products may be produced utilizing the machine of the present invention.

If it is desired not to operate the shearing knives 250, the pin 264 is simply withdrawn from the cam 262 and locked in its withdrawn position. This permits the shaft 70 to rotate freely without rotating the cam 262 and hence without reciprocating the knives 250.

The machine of the present invention utilizes a relatively small amount of air, since the passageways for the air from the valves, such as valve 56, to the needles 110, are short and relatively small, yet adequate. Furthermore, the air pressure may be readily varied by opening and closing the valves, such as valve 56, thereby permitting a faster peak pressure to be achieved and permitting the pressure to be diminished quickly. Not only is there an advantage derived in the saving of compressed air, but the speed with which the valving arrangement of the present invention operates, enables the device of the present invention to operate quite efficiently, as intended. The cam shaft 86, together with the cams 87 are located within the cross head 30, in the lower portion thereof, so that the lubricating oil which is normally passed through the crank shaft 70 to the various cams and bearings thereof will incidently lubricate the cam shaft 86. On the other hand, the air within the chamber 50a is usually at a higher pressure than atmospheric and, therefore, prevents the lubricating oil from passing into the air passageways. By the provision of the valves 56 on the cross head 30 the necessity of a flexible conduit or a plurality of flexible conduits leading to the needle bar 95 is eliminated. Thus, quite rigid leak-proof conduits 54 may be utilized.

Since the stroke of the machine is only sufficient to penetrate the backing material B and since the loops being formed are not dependent upon the depth of penetration of needles 110, the weight or mass of the reciprocating parts is reduced to a minimum, thereby enabling the machine to be operated at a relatively high speed.

The overall construction of the device is quite simple, and quite reliable, thus, there is less air wasted, less parts to malfunction and the machine is less expensive to operate.

The cantilever construction of the needle bar 95 and the fact that the needles 110 are located in the forward portion of the needle bar 95, essentially directly beneath and closely adjacent the yarn feed mechanism 300, enables the yarns Y to be fed downwardly so as to be received in the central portion of the yarn passageways 122.

Due to this construction of the needle bar 95, the tufting zone is brought forward with respect to the conventional tufting machines so as to arrange the needles 110 for receiving the yarns Y in an approximately straight downward paths, thereby permitting the needles 110 to telescope over the yarns Y on the upstroke. Thus, there is less tension on the yarns Y, a more uniform loop height is obtained, there is less air required for feeding the yarns Y, there is less abrasion on the yarns and there is greater efficiency of the needles 110 in their operation due to the fact that the yarns Y are centered.

The needles 110 being in the forward portion of the machine are readily removable, in the event a needle 110 becomes damaged and must be replaced. The replacement is also a quite simple operation in that a single set screw holds each needle 110 in place.

The presser foot 140 and its slide plate 141 permit a loop, once formed, to be removed quickly from the apertures 211 in the shear plate 210, regardless of whether the loop has been sheared along its bight portion or not. This rapid removal of the loop by the bending of the backing material B, immediately after a loop has been sewn therein, makes room for a subsequent loop. The V-shaped cross-section of the presser foot enables the presser foot to be made of light metal and yet be sufficiently rigid to perform its intended purpose. The presser foot 140 being adjustable vertically sidewise and forwardly and rearwardly, can readily establish within close tolerances proper alignment of holes 142 with needles 110.

Since the outfeed rollers 281 and 285 are driven at a slightly greater peripheral speed than the infeed rollers 271 and 272, the backing material B is held quite taut around the presser foot 140 and is therefore supported to a certain extent, off of the needle plate 206. Thus, the filling or weft yarns in the woven backing material B are free to be displaced forwardly and rearwardly by the hollow needles 110 as the hollow needles 110 penetrate the backing material B. Hence, when operating the device of the persent invention, the needles 110 are less prone to be overheated and there is less power required to penetrate the backing material B.

Figure 18A:
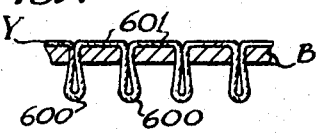

Referring now to FIGS. 18A to 18K, many of the types of tufted fabrics which may readily be produced on this machine are illustrated. For example, a level loop pile fabric, such as illustrated in FIG. 18A, may be produced by feeding yarns Y at a uniform rate from the yarn control mechanism 300 and by rendering inoperative the knives 250. In FIG. 18A, the uniform pile height loops are denoted by numerals 600. The backstitches connecting the adjacent loops 600 are denoted by numeral 601.

Figure 18D:
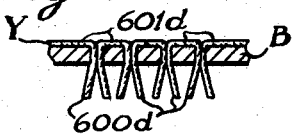
Figure 18B:
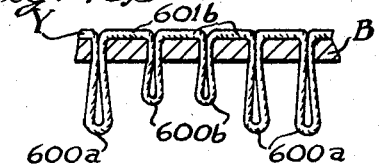

In FIG. 18B, it is seen that a high-low loop pile fabric may also be produced. This high-low loop pile fabric is produced by utilizing the slats or notch bars 303 of the yarn control mechanism 300 or any suitable yarn feed mechanism to feed varying amounts of yarns Y to the needles 110 according to a prescribed pattern. In FIG. 18B the high loops, sewn in such manner, are denoted by numeral 600a and the low loops are denoted by the numeral 600b. The backstitch 601b lies flat against the upper surface of backing material B and is connected between the legs of the adjacent loops 600a and 600b.

Figure 18E:
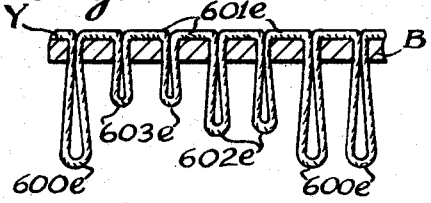
Figure 18C:
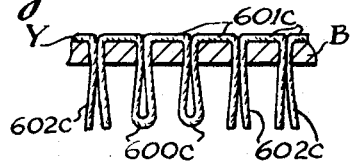

In FIG. 18C, it will be seen that cut and loop pile having essentially the same pile height may be produced by the machine of the present invention. To accomplish this, the yarn feed mechanism 300 is arranged so as to feed high and low loops, in which the high loops are only slightly longer than the low loops. Also, the shearing mechanism is arranged to sever only the long loops, at approximately the height of the low loops 600c. Thus, the high loops when cut by the shearing mechanism are converted into cut pile tufts, denoted by the numeral 602c. The backstitch 601c interconnects the legs of the adjacent tufts 600c and 602c.

In FIG. 18D, a level cut pile fabric is illustrated which may be produced on the tufting machine of the present invention. This level cut pile fabric is produced in the same manner as the production of the level loop pile fabric, illustrated in FIG. 18A, except that the shearing mechanism of the machine is raised sufficiently so that all loops produced protrude through the apertures 211 in the shear plate 210 and are, therefore, severed by the knives 250. This produces the level cut pile, denoted by numerals 600d in FIG. 18D the cut pile being connected by the backstitches 601d.

In FIG. 18E, it will be seen that, if desired, a high-low or patterned loop pile fabric may be produced in which there are thre different pile heights. This is accomplished simply by the notching of the notch bars 303 of the yarn control mechanism 300 so as to feed three different amounts of yarn to the needles 110 in subsequent cycles. In FIG. 18E, the high loops are denoted by numerals 600e, the intermediate loops are denoted by numerals 602e and the low loops are denoted by numerals 603e. The loops 600e, 602e and 603e are connected by backstitches 601e.

Figure 18F:
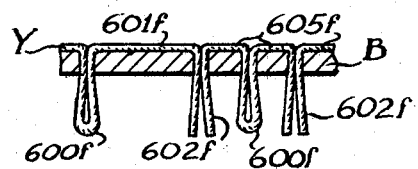

In FIG. 18F, a skip stitch cut and loop fabric is illustrated which can be produced on the machine of the present invention. To produce this fabric, the yarn feed mechanism 300 is arranged so as to feed the yarn Y for producing high-low pile height, except where a stitch is to be skipped. At that point, insufficient yarn is fed to a needle 110 so that the needle 110 on its downstroke sews a loop of minimum height which, upon movement of the backing material B and upon the upstroke of the needles 110, is pulled out of the backing material B. Therefore, a long backstitch 601f is created between the loop 600f and the subsequent loop which is sewn at a slightly greater height and severed by the shearing mechanism. This cut pile tuft is denoted by numeral 602f. In FIG. 18F, the short or conventional backstitch is denoted by numeral 605f.

Figure 18G:
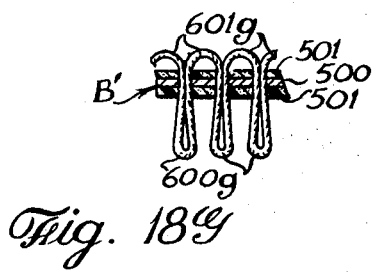

In FIG. 18G, a double faced fabric is illustrated which may be produced on the present machine. In producing the double face fabric, it is preferable to utilize backing material B' which has the nylon net fabric 500 provided with the polyurethane foam 501 impregnated therein. When the machine is operated for producing the double face fabric of FIG. 18F, the air is fed continuously to the needles 110 and the yarn control mechanism 300 is adapted so as to feed an exces of yarn Y during the period in which the needles 110 are withdrawn from the backing material B'. Thus, an excess of backstitch produces the loops 601g on the upper surface of the backing material B'. The conventional loops 600g are also produced on the other surface and are connected by their legs to the legs of backstitch loops 601g. It will be understood that the loops 600g are produced by feeding uniform amounts of yarn Y to the needles 110 during the period in which the needles 110 are penetrating the backing material B'.

In FIG. 18H, it is seen that, if desired, the tufting machine of the present invention may be utilized for producing a multi-color fabric. To accomplish this, two different colored yarns Y and Y' are fed to each needle 110 of the machine. The yarn control mechanism 300 is arranged for sewing high and low loop pile fabric in such a manner that the yarn Y creates low loops 600h and high loops 602h interconnected by backstitches 601h. Each needle 110, however, also inserts the yarn Y' for creating high and low loops 603h and 604h, respectively. The portions of both yarns Y and Y', of course, are inserted in the same hole as a particular tuft is formed and therefore, the longer loop 603h and 602h, in the event one loop is longer than the other, will predominate as to color. In this way a prescribed pattern of two particular colors may be produced.

The long loops of FIG. 18H, may, if desired, be cut by disposing the yarn shearing mechanism, namely, the shear plate 210 and the knives 250, at a height such that the high loops 603h and 602h protrude through the apertures 211. Thus, a fabric such as illustrated in FIG. 18I is produced. In FIG. 18I, the high cut pile from yarn Y is denoted by numeral 600i, while the high cut pile from yarn Y' is denoted by numeral 602i. The low loops formed from yarn Y are denoted by the numeral 603i while the low loops formed from Y' are denoted by numeral 604i. The backstitches formed by the yarn Y are denoted by the numerals 601i.

By feeding the air continuously to the needles 110 and by arranging the yarn feeding mechanism 300 so as to feed different excess amounts of yarns while the needle 110 is withdrawn from the backing material B and also different lengths of yarns while the needles 110 are penetrating the backing material B, and by arranging the shearing mechanism so that knives 250 shear the highest loops so formed, a tufted fabric such as illustrated in FIG. 18J is produced.

In FIG. 18J, on the bottom side of the backing material B, the cut pile tufts are denoted by numerals 600j, these tufts being produced from the longest loops sewn through the backing material B, the loops being sufficiently long that they protrude through the apertures 211 in the shear plate 210. The short loops are denoted by numeral 602j and the intermediate loops which, after the tufts 600j have been severed, are the longer loops, are denoted by the numeral 603j. On the upper face of the backing material B, the high loops are denoted by the numeral 601j and the low loops are denoted by the numerals 605j.

If the yarn control mechanism 300 is arranged to feed yarn for the production of three different pile heights, and if the shear plate 210 is arranged to cut the highest loop, a fabric such as illustrated in FIG. 18K may be produced. In this fabric, the cut pile tufts are denoted by the numeral 600k, the high loops are denoted by the numeral 602k and the low loops are denoted by the numeral 603k, the respective loops being connected by backstitch 601k. Of course, it will be realized that the cut pile tufts 600k will be formed from the longest loops sewn by the needle 110, and hence the intermediate length loops 602k become the long loops in the resulting fabric.

Still other combinations of loops and cut tufts may be devised by those skilled in the art, other than those illustrated in FIGS. 18A-18K. It should be noted, however, that contrary to the tufts produced by conventional tufting machines having loopers therein, the legs of the tufts and the backstitches sewn by the needles 110 are in longitudinal alignment in each longitudinal row. In other words, in each longitudinal row of stitches produced by a single needle 110 of the machine, the legs, such as legs 610 and 611, of each cut tuft and the legs, such as legs 612 and 613, of each loop tuft are aligned warpwise of the backing material B. Also, since the loops need not be caught by loopers, the backstitches, such as backstitches 601k, are aligned with each other and with the legs 610, 611, 612 and 613 warpwise of the backing material B.

In the same manner, the loops of the double face fabric in each longitudinal row have legs, such as legs 614 and 615, in longitudinal alignment with each other and with legs 616 and 617 of the tufts on the opposite side of backing material B'.

The alignment of the legs of the tufts, as described above, coupled with the fact that the pile heights of both the cut tufts and the loop tufts of the tufted fabric, produced on he machine of the present invention, are quite precise, i.e., the high tufts are of essentially the same uniform height and the low loops are of the same uniform height provide a superior product. Furthermore, since each tuft is subjected to a stream of fluid, such as air, and to little tension in its formation, the tuft has a full blossoming appearance which covers and hides the backing material B to a greater extent than tufts produced on conventional tufting machines in which the tufts must be engaged by loopers. Thus, a tufted fabric which is of high quality and pleasing appearance is produced.

Since the cut tufts are subjected to fluid, such as air, after being cut, the air tends to untwist the legs of the tufts, thereby aiding in the blossoming out of the cut tufts when the tufted fabric is subjected to fluid in a subsequent dying or steaming operation.

The cutting of the tufts, in the tufting zone by movement of the knives 250 transversely of the tuft and parallel to the backing material B, provides tufts having legs 610 and 611 of uniform length. This eliminates the necessity for a subsequent shearing operation after tufts have been removed from the tufting zone.

It will be obvious to those skilled in the art that many variations may be made in the embodiments here chosen for illustrating the present invention without departing from the scope thereof as defined by the appended claims.

What is claimed as invention is:

1. In a method of tufting wherein successive loops of yarn are formed in a backing material and wherein as each loop is formed differential fluid pressure holds the loop in an extended condition, the step of severing the loop as it is held extended prior to the formation of a subsequent loop.

2. In a method of tufting wherein a loop is formed by yarns in a backing material and differential fluid pressure extends the loops to a prescribed length as it is formed, the step of severing the extermity of the loop while the loop is extended by said differential fluid pressure.

3. In a method of tufting wherein successive loops are formed in a backing material and wherein each such loop is formed by inserting an intermediate portion of the yarn through the backing material moved along a prescribed path and the loop is blown away from the backing material while yarn is fed to the loop until a prescribed amount of yarn has been supplied to the loop, the steps of severing the extremity of said loop in a severing zone prior to the formation of a subsequent loop and progressively flexing the backing material adjacent the severed loop as the backing is moved along its path for aiding in the withdrawal of the severed loop from the severing zone.

4. In a tufting machine having means for holding the tufts created in the backing material in an extended condition by a stream of fluid, the combination therewith of means for severing at least some of the tufts while they are held in said extended condition.

5. In a tufting machine of the type wherein fluid differential pressure urges yarn out of a needle during the period in which said needle yarn out of a needle during the terial and holds the yarn extended away from said backing, the combination therewith of shearing means disposed in spaced relationship to said backing material for severing the extremity of said yarn while it is held extended by said fluid pressure.

6. In a tufting machine of the type having means for moving a backing material along a prescribed path through the machine, a plurality of needles on one side of said path for inserting yarns through the backing material from one side the backing material for creating tufts extending from the other side of backing material, the combination therewith of a shear plate disposed on the other side of said path with one side adjacent said path and having apertures axially aligned with said needles for receiving said tufts, a plurality of resilient knives having cutting edges, means for holding said knives in a flexed condtion with their cutting edges resiliently held against the other side of said shear plate, and means for moving said knives across said apertures longitudinally relative to said path for severing the tufts which protrude beyond the shear plate.

7. In a tufting machine of the type including a plurality of needles to insert yarns through a backing material for creating tufts therein, means for moving the backing material along a prescribed path through the tufting machine to receive the tufts, the combination therewith of a presser foot assembly carried by said tufting machine adjacent said needles, said presser foot assembly including a presser foot disposed adjacent the needles, an inclined slide plate secured to said presser foot along a common edge, and means for urging said backing material against said presser foot during its movement through said tufting machine, said slide plate being so disposed with respect to said presser foot that said backing material is bent in a direction away from said tufts as it passes said common edge.

8. In a tufting machine of the type having reciprocatable needles moved in a prescribed path of reciprocation for inserting yarns downwardly through a backing material from one side thereof for creating tufts on the other side of said backing material, means for feeding said backing material along a first path of travel approximately normal to the path of reciprocation of said needles to receive the tufts, a presser foot disposed adjacent said first path of travel and adjacent the path of reciprocation of said needles, the combination therewith of means cooperating with said presser foot for guiding said material into a second path inclined upwardly with respect to said first path to bend said backing material away from the side thereof containing said tufts, and a shearing mechanism disposed adjacent said first path for shearing said tufts in said backing material at a location immediately ahead of the inclination of said second path relative to said first path.

9. In a tufting machine of the type wherein tufting means successively insert yarn through a backing material from one side for producing a row of successive tufts on the other side thereof, means for moving the backing material along a prescribed path past the tufting means to receive the tufts, the combination therewith of a shearing mechanism disposed on said other side of said backing material, said shearing mechanism including a shear plate disposed parallel to and adjacent said prescribed path opposite said tufting means and provided with apertures through which said tufts may project as they are formed, said shear plate having a flat surface remote from said prescribed path, a resilient knife having a flat cutting edge, means to flex said knife to bias said cutting edge against said remote surface of said shear plate and means to reciprocate said knife across said aperture of said shear plate to sever said tufts at a prescribed distance from said backing material.

10. In a tufting machine of the type having a cross head and a cross bed extending between end stanchions and wherein said cross head has a main drive shaft driven by a motor, said end stanchions carry infeed and outfeed rollers for passing the backing material between said cross head and said cross bed, and a needle bar having needles therein for inserting yarns through the backing material, said needle bar being reciprocated by said main drive shaft, the combination therewith of a shear plate carried by said cross bed beneath said needles and having apertures therein aligned with said needles and said shear plate having grooves in its upper surface leading rearwardly of said apertures, the edges defining the lower forward ends of said apertures being beveled to acute angles, knife means extending forwardly and upwardly and flexed against the lower surface of said shear plate and reciprocatable across said apertures for cutting cooperation with the beveled edges, means for reciprocating said knife means, said shear plate and said knife means being movable together as a unit in a vertical path, means for moving said unit and an exhaust blower connected to said cross bed for reducing the atmospheric pressure within said cross bed.

11. In a tufting machine of the type having end stanchion, a cross head and a cross bed extending between said end stanchions, and a motor and wherein said cross head has a main drive shaft driven by said motor and said end stanchions carry infeed and outfeed rollers for passing the backing material between said cross head and said cross bed, the combination therewith of a cam shaft within said cross head and driven from said main drive shaft, a plurality of valves in said cross head, a plurality of cams on said cam shaft for simultaneously opening and closing said valves, a source of fluid under pressure communicating with said valves, a plurality of push rods slideably carried by said cross head and reciprocated by said main drive shaft, a needle bar carried by said push rods, and a plurality of hollow needles projecting through said needle bar, said needles, said needle bar, said push rods and said cross head being provided with communicating passageways through which fluid travels from said source of fluid under pressure to said needles when said valves are opened.

12. In a tufting machine of the type having a cross head and a cross bed extending between end stanchions and wherein said cross head has a main drive shaft driven by a motor, and said end stanchions carry infeed and outfeed rollers for passing the backing material between said cross head and said cross bed, the combination therewith of a cam shaft within said cross head and driven from said main drive shaft, a plurality of valves in said cross head, a plurality of cams for simultaneously opening and closing said valves, a source of fluid under pressure communicating with said valves, a plurality of push rods slideably carried by said cross head and reciprocated by said main drive shaft, a needle bar carried by said push rods, a bracket projecting down from said cross head, an inclined slide plate carried by said bracket, means for adjusting the vertical position of said slide plate, a presser foot projecting from said slide plate, a plurality of hollow needles projecting through said needle bar, said presser foot having holes therein aligned with said needles and through which said needles are adapted to project, said needles, said needle bar, said push rods and said cross head being provided with communicating passageways through which fluid travels from said source of fluid under pressure to said needles when said valve is opened, a needle plate carried by said cross bed and having a plurality of spaced vanes protruding rearwardly therefrom, the space between said vanes being axially aligned with said needles, said rollers passing the backing material beneath said presser foot and over said needle plate, a shear plate beneath said needle plate and having apertures therein aligned with and below the extremity of reciprocation of said needles, said shear plate having grooves in its upper surface leading rearwardly of said apertures, the edges defining the lower forward ends of said apertures being beveled to acute angles, knife means extending forwardly and upwardly and flexed against the lower surface of said shear plate and reciprocatable across said apertures for cutting cooperation with the beveled edges, and means for reciprocating said knife means.

13. In a tufting machine of the type having a cross head and a cross bed extending between end stanchions and wherein said cross head has a main drive shaft driven by a motor and said end stanchions carry infeed and outfeed rollers for passing the backing material between said cross head and said cross bed, the combination therewith of variable speed drive means connected between said motor and said main drive shaft for varying the speed at which said drive shaft is rotated by said motor. a cam shaft within said cross head and driven from said main drive shaft, a plurality of valves in said cross head, a plurality of cams on said cam shaft for respectively controlling the opening and closing of said valves, a source of fluid under pressure communicating with said valves, a plurality of push rods slideable carried by said cross head and reciprocated by said main drive shaft, a needle bar carried by said push rods, brackets projecting down from said cross head, an inclined slide plate carried by said brackets, means for adjusting the vertical position of said slide plate, a presser foot projecting from said slide plate, a plurality of hollow needles projecting through said needle bar, said presser foot having holes therein aligned with said needles and through which said needles are adapted to project, said needles, said needle bar, said push rods and said cross head being provided with communicating passageways through which fluid travels from said source of fluid under pressure to said needles when said valves are opened, a needle plate carried by said cross bed and having a plurality of spaced vanes protruding rearwardly therefrom, the space between said vanes being axially aligned with said needles, said backing material passing beneath said presser foot and over said needle plate, a shear plate beneath said needle plate and having apertures therein aligned with and below the extremity of reciprocation of said needles, said shear plate having grooves in its upper surface leading rearwardly of said apertures, the edges defining the lower forward ends of said apertures being beveled to acute angles, a plurality of knife means extending forwardly and upwardly and flexed against the lower surface of said shear plate and reciprocatable across said apertures for cutting cooperation with the beveled edges, means for reciprocating said knife means, a deflector plate connected to said shear plate and inclined rearwardly and upwardly for defining with said slide plate an upwardly and rearwardly extending exit pathway for the tufted backing material, said knife means and said shear plate and said deflector plate being movable together as a unit in a vertical path, means for moving said unit, an exhaust blower connected to said cross bed for reducing the atmospheric pressure within said cross bed, a yarn control mechanism carried between said end stanchions for feeding yarns to said needles according to a prescribed pattern, and variable speed drive means connected between said yarn control mechanism and said main drive shaft.

14. The structure defined in claim 13, wherein said means for reciprocating said knife means includes a rocker shaft connected to said knife means for reciprocating the same upon rocking of said rocker shaft, a pitman connected to said rocker shaft, a cam freely rotatable on said main drive shaft, a drive plate carried by said main drive shaft, and detent means interconnecting said drive plate and said cam shaft.

15. In a tufting machine of the type wherein reciprocating needles sew yarns in a backing material moved past the needles, the combination with said reciprocating needles of a presser foot assembly, said presser foot assembly including a presser foot through which said needles project and means for supporting said presser foot, said presser foot having open ended slots aligned with said needles which open in the direction of movement of the backing material to provide passageways for the sewn yarns carried by the backing material to pass from the presser foot.

16. In a tufting machine of the type having a main drive shaft, a cam on the main drive shaft, a pitman connected to the cam for reciprocation thereby, and a rocker arm connected to the pitman for oscillation thereby, the combination wherein said cam is freely rotatable on said drive shaft, and including a drive plate disposed adjacent said cam and rotated by said main drive shaft and a detent interconnecting said drive plate and said cam, said detent being movable from its position interconnecting said cam and said drive plate to a position disconnecting said cam and said drive plate.

17. In a process of tufting wherein tufts are formed in a backing material, the steps of moving the backing material through a tufting zone, inserting yarn from one side of the tufting zone through the backing material, severing a portion of said tufts from the other side of the tufting zone while the tufts are still in said tufting zone, and directing fluid adjacent the tufts in the tufting zone for removing the several portions thereof.

18. In a process of tufting wherein tufts are formed in a backing material in a tufting zone, the step of directing fluid through said backing material and simultaneously across a plurality of said tufts immediately after said tufts are formed as said tufts are passed out of said tufting zone.

19. In a method of tufting wherein successive long and short loops are formed by yarn in a longitudinal row in a backing material as the backing material is moving through a tufting zone, the steps of holding the long loops extended by differential fluid pressure and severing the long loops transversely of each long loop while the loops being severed are still in said tufting zone to remove a portion of each long loop without altering the condition of said short loops.

20. In a tufting machine of the type wherein a push rod reciprocates a hollow needle bar for inserting yarn carried by a hollow needle on said needle bar through a backing material, the hollow portions of said needle bar and said needle being in communication with each other, and wherein a cross head slidably carries said push rod for axial movement of said pushrod, the combination therewith wherein said push rod is provided with an axial passageway closed at one end and communicating with the hollow portion of said needle bar, said push rod also being provided with a port communicating with said passageway intermediate the ends of said push rod, said cross head having a fluid passageway communicating with said push rod, a source of fluid under pressure communicating with the fluid passageway of said cross head and a valve in the passageway of said cross head adjacent said push rod.

21. In a tufting machine of the type wherein a push rod reciprocates a hollow needle bar for inserting yarn carried by a hollow needle on said needle bar through a backing material, the hollow portions of said needle bar and said needle being in communication with each other, and a cross head slidably carries said push rod for axial movement of said push rod, the combination therewith wherein said push rod is provided with an axial passageway closed at one end and communicating with the hollow portion of said needle bar, said push rod also being provided with a port communicating with said passageway intermediate the ends of said push rod, said cross head having a fluid passageway communicating with said push rod and a source of fluid under pressure communicating with the fluid passageway of said cross head.

22. In a method of tufting wherein successive loops of yarn are formed in a backing material and wherein as each loop is formed differential fluid pressure holds the loop in an extended condition, severing at least some of the loops as they are held extended prior to the formation of subsequent loops.

23. A tufting machine as recited in claim 6 wherein said knives have angled cutting edges and said knife holding means comprises a knife block.

24. A tufting machine as recited in claim 21 wherein a plurality of said needles are carried by said needle bar to form a plurality of tufts simultaneously.

25. In a tufting machine having means for moving a backing material along a prescribed path through a tufting zone, a plurality of needles each having a passage therein, means for reciprocating the needles through said prescribed path to cause the needles alternately to penetrate and be withdrawn from the backing material, means for inducing a flow of fluid through said needle passages to project yarn through the passages while the needles are penetrating the backing material to form a plurality of loops in the backing material and to retain the loops in extended positions for a period of time during which the needles are withdrawn from the backing material, means to deliver to said needle passages different controlled lengths of yarn so that some of said loops are long and extend below a prescribed plane and others of said loops are short and terminate above said prescribed plane, the combination therewith of a cutting device situated below said prescribed path adjacent said tufting zone and means to selectively position said cutting device either at said prescribed plane to sever the ends of said long loops while they are retained by said fluid flow in said extended positions leaving said short loops uncut or below said prescribed plane to leave both said long and short loops uncut.

26. A tufting machine as recited in claim 25 wherein said cutting device when positioned at said prescribed plane is aligned with said needle passages.

27. In a tufting machine having means for moving a backing material along a prescribed path through a tufting zone, a plurality of yarn carrying needles, means for reciprocating the needles through said prescribed path to cause the needles alternately to penetrate and be withdrawn from the backing material to form a plurality of loops in the backing material, means to deliver to said needles different controlled lengths of yarn so that some of said loops are long and extend below a prescribed plane and others of said loops are short and terminate above said prescribed plane, the combination therewith of a cutting device situated below said prescribed path adjacent said tufting zone, means to selectively position said cutting device either at said prescribed plane to sever the ends of said long loops leaving said short loops uncut or below said prescribed plane to leave both said long and short loops uncut, and means to apply differential fluid pressure to the loops being severed to retain them extended from the needles while they are severed.

References Cited
UNITED STATES PATENTS

| | | | |
|---|---|---|---|
| 1,970,703 | 8/1934 | Loos | 112—79 |
| 2,107,483 | 2/1938 | Knight | 74—230.17 |
| 2,111,077 | 3/1938 | Reeves | 74—230.17 |
| 2,356,378 | 8/1944 | Capolupo | 26—7 |
| 2,855,879 | 10/1958 | Manning et al. | 112—79 |
| 2,876,525 | 3/1959 | Janney et al. | 28—78 |
| 2,912,945 | 11/1959 | Nowicki | 112—79 |
| 3,089,442 | 5/1963 | Short | 112—79 |
| 3,096,734 | 7/1963 | Card | 112—79 |
| 3,225,723 | 12/1965 | Wilkes | 112—80 |
| 2,623,488 | 12/1952 | Ashworth | 112—220 |
| 3,144,844 | 8/1964 | Elliott et al. | 112—80 |

FOREIGN PATENTS 618,165 2/1949 Great Britain.

JORDAN FRANKLIN, *Primary Examiner.*

JAMES R. BOLER, *Examiner.*